(12) United States Patent
Torayashiki et al.

(10) Patent No.: US 10,088,672 B2
(45) Date of Patent: Oct. 2, 2018

(54) MIRROR DEVICE INCLUDING ACTUATOR CONTROLLED BASED ON CAPACITANCE

(71) Applicant: SUMITOMO PRECISION PRODUCTS CO., LTD., Hyogo (JP)

(72) Inventors: Osamu Torayashiki, Hyogo (JP); Ryohei Uchino, Hyogo (JP); Tokiko Misaki, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 60 days.

(21) Appl. No.: 14/777,061

(22) PCT Filed: Nov. 25, 2013

(86) PCT No.: PCT/JP2013/006900
§ 371 (c)(1),
(2) Date: Sep. 15, 2015

(87) PCT Pub. No.: WO2014/155448
PCT Pub. Date: Oct. 2, 2014

(65) Prior Publication Data
US 2016/0025964 A1 Jan. 28, 2016

(30) Foreign Application Priority Data
Mar. 26, 2013 (JP) ................................. 2013-063174

(51) Int. Cl.
*G02B 26/08* (2006.01)
*G02B 6/35* (2006.01)

(52) U.S. Cl.
CPC ......... *G02B 26/0816* (2013.01); *G02B 6/356* (2013.01); *G02B 26/0858* (2013.01)

(58) Field of Classification Search
CPC .................. G02B 26/0816; G02B 26/0858
(Continued)

(56) References Cited

U.S. PATENT DOCUMENTS

| | | | |
|---|---|---|---|
| 6,701,037 B2 * | 3/2004 | Staple | B81B 3/0008 385/18 |
| 2003/0123124 A1 * | 7/2003 | Abu-Ageel | H02N 1/008 359/290 |

(Continued)

FOREIGN PATENT DOCUMENTS

| | | |
|---|---|---|
| JP | 6-46207 A | 2/1994 |
| JP | 2007-534017 A | 11/2007 |

(Continued)

OTHER PUBLICATIONS

International Search Report for corresponding International Application No. PCT/JP2013/006900, dated Dec. 24, 2013.
(Continued)

*Primary Examiner* — Darryl J Collins
*Assistant Examiner* — Journey Sumlar
(74) *Attorney, Agent, or Firm* — Renner Otto Boisselle & Sklar, LLP

(57) ABSTRACT

A mirror device includes a mirror, an actuator tilting the mirror, a first hinge coupling the mirror to the actuator, a base, a second hinge coupling the mirror to the base, a movable comb electrode coupled to the mirror, and a fixed comb electrode fixed to the base. The actuator is controlled based on a capacitance between the movable comb electrode and the fixed comb electrode. The movable comb electrode is disposed on a portion of the mirror closer to the second hinge than to the first hinge.

16 Claims, 14 Drawing Sheets

(58) Field of Classification Search
USPC ..... 351/221; 359/221.1, 221.2, 221.3, 225.1, 359/226.1, 226.2
See application file for complete search history.

(56) References Cited

U.S. PATENT DOCUMENTS

| | | | |
|---|---|---|---|
| 2004/0227984 A1* | 11/2004 | Yamabana | G02B 26/0841 359/290 |
| 2005/0094931 A1 | 5/2005 | Yokoyama et al. | |
| 2007/0058238 A1 | 3/2007 | Mala et al. | |
| 2008/0239446 A1* | 10/2008 | Jung | G02B 26/0841 359/225.1 |
| 2011/0222137 A1 | 9/2011 | Matsumoto et al. | |

FOREIGN PATENT DOCUMENTS

| | | | |
|---|---|---|---|
| WO | WO 03/062899 A1 | 7/2003 | |
| WO | WO 2010/001613 A1 | 1/2010 | |

OTHER PUBLICATIONS

PCT/ISA/237 for corresponding International Application No. PCT/JP2013/006900, dated Dec. 24, 2013.

* cited by examiner

MIRROR DEVICE INCLUDING ACTUATOR CONTROLLED BASED ON CAPACITANCE

TECHNICAL FIELD

A technique disclosed herein relates to a mirror device.

BACKGROUND ART

Various mirror devices have been conventionally known. The mirror device disclosed in Patent Document 1 includes an actuator on which a piezoelectric element is stacked and a mirror coupled to the tip end of the actuator. This mirror device applies a voltage to the piezoelectric element to allow the actuator to curve, thereby tilting the mirror.

CITATION LIST

Patent Document

PATENT DOCUMENT 1: Japanese Unexamined Patent Publication No. H06-46207

SUMMARY OF THE INVENTION

Technical Problem

However, the actuator using such a piezoelectric element has hysteresis and creep characteristics. This makes it difficult to control the degree of tilt of the mirror.

The technique disclosed herein has been developed in view of the above problem, and is intended to precisely control tilting of a mirror.

Solution to the Problem

The mirror device disclosed herein includes: a mirror; an actuator having a piezoelectric element and tilting the mirror; a first hinge coupling the mirror to the actuator; a base; a second hinge coupling the mirror to the base; a movable comb electrode coupled to the mirror; and a fixed comb electrode fixed to the base and facing the movable comb electrode. The actuator is controlled based on a capacitance between the movable comb electrode and the fixed comb electrode. The movable comb electrode is disposed on a portion of the mirror closer to the second hinge than to the first hinge.

According to this configuration, the mirror is coupled to the actuator through the first hinge, and is coupled to the base through the second hinge. Operation of the actuator allows for significantly displacing a portion of the mirror to which the first hinge is coupled, thereby tilting the mirror as a whole. The mirror is tilted with the second hinge generally serving as a center.

The mirror is provided with the movable comb electrode. The fixed comb electrode is also provided to face the movable comb electrode. When the mirror is tilted, the movable comb electrode is also displaced with the tilting, thereby changing the capacitance between the movable comb electrode and the fixed comb electrode. Detecting the amount of change in the capacitance enables detection of the degree of tilt of the mirror. That is, controlling the actuator based on the capacitance enables precise control of the degree of tilt of the mirror.

In addition, the movable comb electrode is disposed closer to the second hinge than to the first hinge. This enables extension of the range where the degree of tilt of the mirror can be precisely detected.

Specifically, the capacitance between the movable comb electrode and the fixed comb electrode is changed according to the area where the movable comb electrode faces the fixed comb electrode. If the movable comb electrode is significantly displaced and the movable comb electrode does not face the fixed comb electrode, the capacitance becomes about zero. As a result, the change in the capacitance cannot be detected. There may be a large fringe effect where the electric field expands in directions in addition to the direction where the movable comb electrode faces the fixed comb electrode. In that situation, even if the movable comb electrode does not face the fixed comb electrode, the change in the capacitance can be detected. However, if the movable comb electrode is far away from the fixed comb electrode, the change in the capacitance cannot be detected. Even if a plurality of sets of the movable comb electrodes and the fixed comb electrodes are provided, disposing all of the movable comb electrodes far away from the respective fixed comb electrodes disables the detection of the change in the capacitance.

Disposing the movable comb electrode at a position closer to the second hinge than to the first hinge means that the movable comb electrode is positioned closer to the center of tilt of the mirror. Disposing the movable comb electrode at a position closer to the center of the tilt allows for reducing the amount of displacement of the movable comb electrode when the mirror is tilted. This allows for extending the tilt range of the mirror where the capacitance between the movable comb electrode and the fixed comb electrode can be detected. As a result, this can extend the range where the degree of tilt of the mirror can be precisely detected.

Advantages of the Invention

This mirror device allows for precisely tilting the mirror.

DESCRIPTION OF EMBODIMENTS

Example embodiments will be described below with reference to drawings.

First Embodiment

Figure 1:
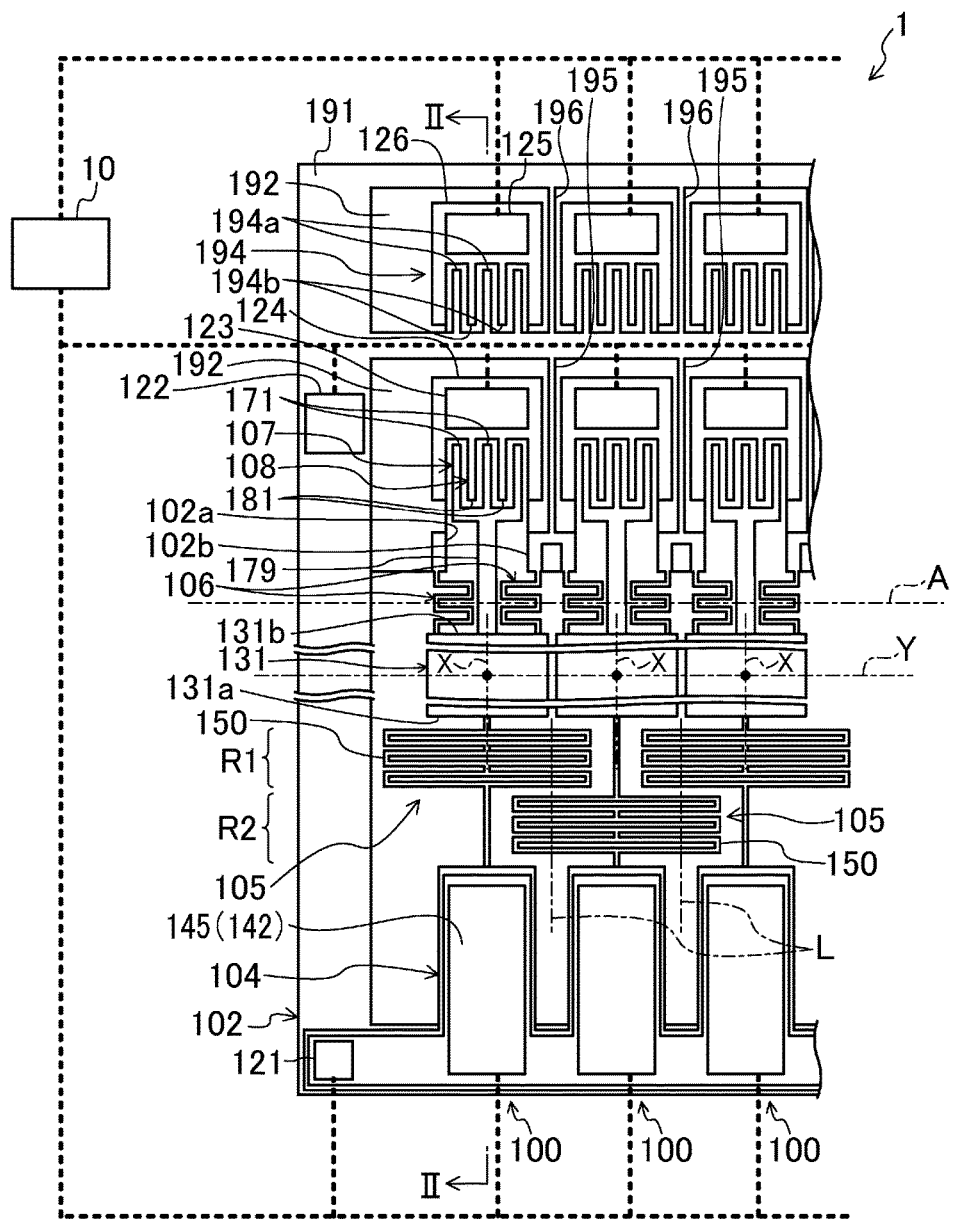
FIG. 1 is a plan view of a mirror array.
Figure 2:
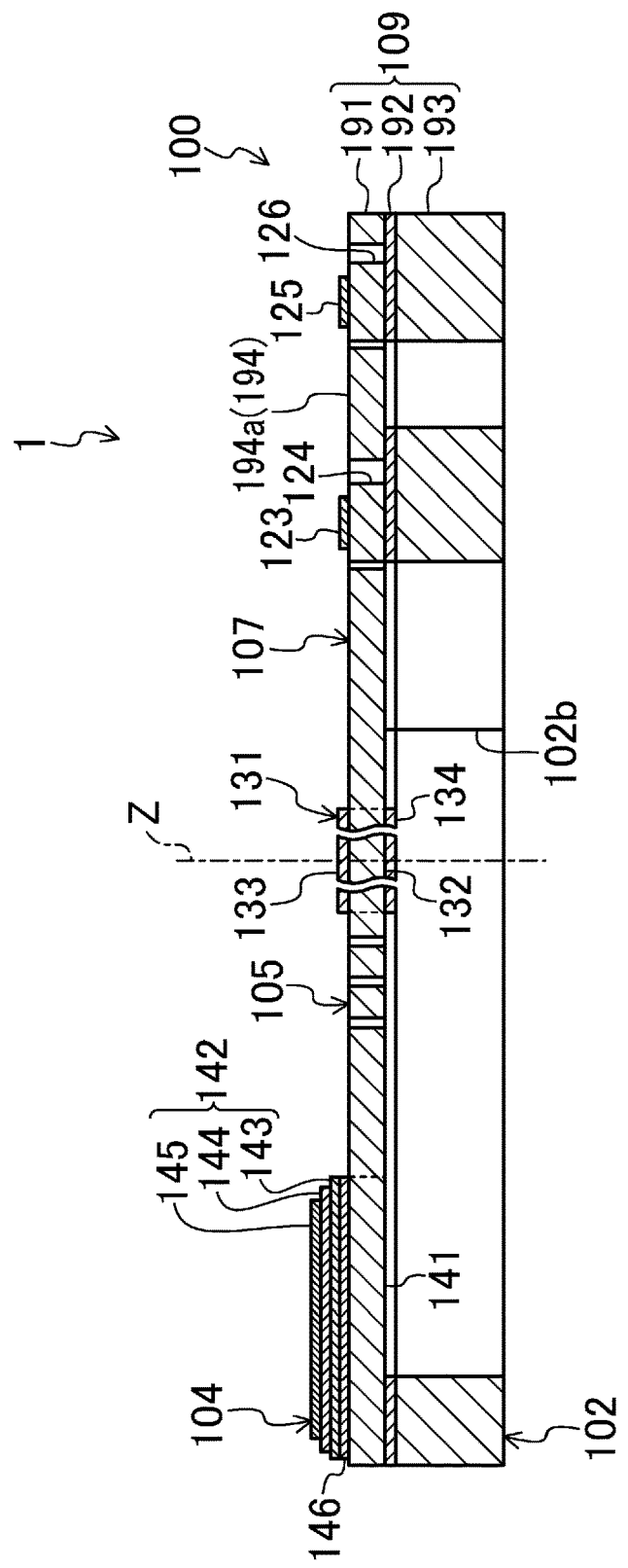
FIG. 2 is a cross-sectional view, taken along the line II-II of FIG. 1, of the mirror array.

FIG. 1 is a plan view of a mirror array 1, and FIG. 2 is a cross-sectional view, taken along the line II-II of FIG. 1, of the mirror array 1.

The mirror array 1 includes a plurality of mirror devices 100, 100, . . . . The plurality of mirror devices 100, 100, . . . are aligned in a predetermined Y-axis direction.

The mirror array 1 is produced using a silicon-on-insulator (SOI) substrate 109 (see FIG. 2). The SOI substrate 109 is comprised of a first silicon layer 191 made of monocrystalline silicon, an oxide layer 192 made of $SiO_2$, and a second silicon layer 193 made of monocrystalline silicon which are stacked in sequence.

The mirror device 100 includes: a base 102; a mirror 131; an actuator 104 driving the mirror 131; a first hinge 105 coupling the mirror 131 to the actuator 104; a second hinge 106 coupling the mirror 131 to the base 102; a movable comb electrode 107 provided for the mirror 131; a fixed comb electrode 108 provided for the base 102; a reference electrode 194; and a controller 10. Note that in the mirror array 1, some of the mirror devices 100, 100, . . . share one controller 10. In the mirror array 1, each mirror device 100 may be provided with one controller 10, or all the mirror devices 100, 100, . . . may share one controller 10.

Although not fully shown, the base 102 is substantially rectangular-frame-shaped. The base 102 is comprised of the first silicon layer 191, the oxide layer 192, and the second silicon layer 193.

The mirror 131 is rectangular plate-shaped when viewed from the top. The mirror 131 includes a mirror body 132, and a mirror surface layer 133 stacked on the surface of the mirror body 132. The mirror body 132 is comprised of the first silicon layer 191, and the mirror surface layer 133 is comprised of an Au/Ti film. A mirror surface layer 134 which is the same as or similar to the mirror surface layer 133 is also stacked on the back surface of the mirror body 132. The mirror surface layer 134 has a function of balancing a film stress occurring in the surface of the mirror body 132 due to existence of the mirror surface layer 133. This can improve not only flatness of the mirror body 132 but also flatness of the mirror surface layer 133.

Here, an axis passing through the middle point of the mirror 131, and extending in a direction in which the mirror 131 and the actuator 104 are aligned is referred to as an X-axis. The X-axis extends parallel to the longer side of the mirror 131. An axis passing through the middle point of the mirror 131 and extending parallel to the shorter side of the mirror 131 is referred to as a Y-axis. The X-axis and the Y-axis are orthogonal to each other. The mirrors 131, 131, . . . are aligned along the Y-axis. In other words, the array direction of the mirrors 131, 131, . . . agrees with the Y-axis direction. An axis orthogonal to the X-axis and the Y-axis is referred to as a Z-axis. The Z-axis direction may be referred to as a vertical direction. In that case, a side closer to the mirror surface layer 133 is the upper side, and a side closer to the mirror body 132 is the lower side.

The actuator 104 extends from the base 102 in a cantilever fashion, and the tip end thereof is coupled to the mirror 131 through the first hinge 105. Allowing the actuator 104 to curve tilts the mirror 131. Specifically, the actuator 104 includes an actuator body 141 having a base end coupled to the base 102, and overhanging from the base 102 in a cantilever fashion, and a piezoelectric element 142 stacked on the surface of the actuator body 141.

The actuator body 141 is rectangular plate-shaped when viewed from the top. The actuator body 141 is comprised of the first silicon layer 191. The actuator body 141 extends in the X-axis direction. The tip end of the actuator body 141 is coupled to, through the first hinge 105, a first shorter side 131a which is one of the shorter sides of the mirror 131.

The piezoelectric element 142 is provided on the front side of the actuator body 141 (the same side on which the mirror surface layer 133 of the mirror 131 is formed). An $SiO_2$ layer 146 is stacked on the surface of the actuator body 141, and a piezoelectric element 142 is stacked on the $SiO_2$ layer 146. The piezoelectric element 142 is also rectangular plate-shaped when viewed from the top, like the actuator body 141. The piezoelectric element 142 has a lower electrode 143, an upper electrode 145, and a piezoelectric element layer 144 sandwiched therebetween. The lower electrode 143, the piezoelectric element layer 144, and the upper electrode 145 are sequentially stacked on the $SiO_2$ layer 146. The piezoelectric element 142 is comprised of another member other than the material of the SOI substrate 109. Specifically, the lower electrode 143 is comprised of a Pt/Ti film. The piezoelectric element layer 144 is comprised of lead zirconate titanate (PZT). The upper electrode 145 is comprised of an Au/Ti film.

The base 102 is provided with a driving terminal 121 electrically connected to the lower electrode 143. A voltage is applied to the piezoelectric element 142 through the upper electrode 145 and the driving terminal 121.

In the actuator 104, when a voltage is applied to the piezoelectric element 142, a surface of the actuator body 141 on which the piezoelectric element 142 is stacked contracts or expands such that the actuator body 141 is curved in the vertical direction.

The first hinge 105 couples two members, namely, the actuator 104 and the mirror 131 together, and is elastically-deformable. The first hinge 105 is comprised of the first silicon layer 191. The configuration of the first hinge 105 will be described in detail later.

The second hinge 106 couples two members, namely, the mirror 131 and the base 102 together, and is elastically-deformable. Each mirror 131 is provided with two second hinges 106. The second hinge 106 has one end coupled to a second shorter side 131b of the mirror 131, and the other end coupled to the base 102. The second hinge 106 is bent in a meandering manner as a whole. The second hinge 106 is comprised of the first silicon layer 191.

The movable comb electrode 107 is provided for a second shorter side 131b of the mirror 131 in a cantilever fashion through an arm 179. The arm 179 extends between the two second hinges 106 in the X-axis direction. The movable comb electrode 107 includes three electrode fingers 171, 171, . . . . The electrode finger 171 is further from the mirror 131 than the second hinge 106 is. Three electrode fingers 171, 171, . . . parallelly extend in the X-axis direction. Each of the movable comb electrodes 107 and the arm 179 is comprised of the first silicon layer 191. The number of the electrode fingers 171 is not limited to the three.

The base 102 is provided with a recess 102a in which the movable comb electrode 107 is disposed. The fixed comb electrode 108 is provided for the recess 102a. The fixed comb electrode 108 has two electrode fingers 181, 181. The two electrode fingers 181, 181 paralelly extend in the X-axis direction. Each of the electrode fingers 181 is disposed between adjacent two of the electrode fingers 171 of the movable comb electrode 107. That is, the electrode fingers 171 of the movable comb electrode 107 face the electrode fingers 181 of the fixed comb electrode 108. The fixed comb electrode 108 is comprised of the first silicon layer 191. The fixed comb electrode 108 is electrically insulated from the movable comb electrode 107. The number of the electrode fingers 181 is not limited to the two.

The base 102 is provided with a first detection terminal 122 and a second detection terminal 123 which are used for detection of a capacitance between the movable comb electrode 107 and the fixed comb electrode 108.

The first detection terminal 122 is provided on the surface of a portion of the first silicon layer 191 of the base 102 electrically connected to the movable comb electrode 107. The plurality of movable comb electrodes 107, 107, . . . share one first detection terminal 122. The first detection terminal 122 may be provided for each mirror device 100.

The second detection terminal 123 is provided on the surface of the electrode portion 124. The electrode portion 124 is comprised of the first silicon layer 191 of the base 102, and is independent from its vicinity on the oxide layer 192 of the base 102 to be electrically insulated from its vicinity. The fixed comb electrode 108 is coupled to the electrode portion 124. The second detection terminal 123 and the electrode portion 124 are provided for each fixed comb electrode 108.

A partition wall 195 is provided between adjacent two of the electrode portions 124, 124. The partition wall 195 is comprised of the first silicon layer 191 on the oxide layer 192. The partition wall 195 extends in a space between adjacent two of the electrode portions 124, 124. The respective both ends of the partition wall 195 are coupled to portions of the base 102 comprised of the first silicon layer 191.

The base 102 is also provided with a reference electrode 194. The reference electrode 194 includes first electrode fingers 194a corresponding to the electrode fingers 171 of the movable comb electrode 107, and second electrode fingers 194b corresponding to the electrode fingers 181 of the fixed comb electrode 108. The configurations of the first electrode fingers 194a and the second electrode fingers 194b are the same as or similar to those of the electrode fingers 171 and the electrode fingers 181. That is, the number of the first electrode fingers 194a provided is three, and the number of the second electrode fingers 194b provided is two. The second electrode finger 194b is disposed between adjacent two of the first electrode fingers 194a. That is, the first electrode fingers 194a face the second electrode fingers 194.

The capacitance of the reference electrode 194 is detected through the first detection terminal 122 and the third detection terminal 125.

The first electrode finger 194a is electrically conducted to a portion of the first silicon layer 191 of the base 102, the portion being provided with the first detection terminal 122.

A third detection terminal 125 is provided on the surface of the electrode portion 126. The configuration of the electrode portion 126 is the same as or similar to that of the electrode portion 124. That is, the electrode portion 126 is comprised of the first silicon layer 191 of the base 102, and is independent from its vicinity on the oxide layer 192 of the base 102 to be electrically insulated from its vicinity. The second electrode finger 194b is coupled to the electrode portion 126.

A partition wall 196 is provided between adjacent two of the electrode portions 126, 126. The partition wall 196 is comprised of the first silicon layer 191 on the oxide layer 192. The partition wall 196 extends in a space between adjacent two of the electrode portions 126, 126. The respective both ends of the partition wall 196 are coupled to portions of the base 102 comprised of the first silicon layer 191.

The oxide layer 192 and the second silicon layer 193 are removed under the mirror 131, the actuator 104, the first hinge 105, the second hinges 106, the movable comb electrode 107, the fixed comb electrode 108, and the reference electrode 194.

A partition wall 102b is provided between the fixed comb electrodes 108, 108 adjacent two of the mirror devices 100, 100. That is, adjacent two of the recesses 102a, 102a are separated by the partition wall 102b. The partition wall 102b is comprised of the first silicon layer 191, the oxide layer 192, and the second silicon layer 193.

The mirror array 1 having such a configuration is produced by etching the SOI substrate 109, and forming the layers on its surface, for example. For example, the $SiO_2$ layer 146 is formed on the surface of the SOI substrate 109, and a Pt/Ti film (the lower electrode 143), lead zirconate titanate (the piezoelectric element layer 144), and an Au/Ti film (the upper electrode 145) are sequentially formed on the $SiO_2$ layer 146, thereby forming the piezoelectric element 142 through photolithography and etching. Next, the first silicon layer 191 is anisotropically etched by, e.g., ICP-RIE, thereby forming, e.g., the mirror body 132 and the actuator body 141. Subsequently, an Au/Ti film is formed on the surface of the mirror body 132, thereby forming the mirror surface layer 133. Thereafter, a predetermined voltage is applied to the piezoelectric element 142 to perform a poling process.

Wavelength Selection Switch

Figure 3:
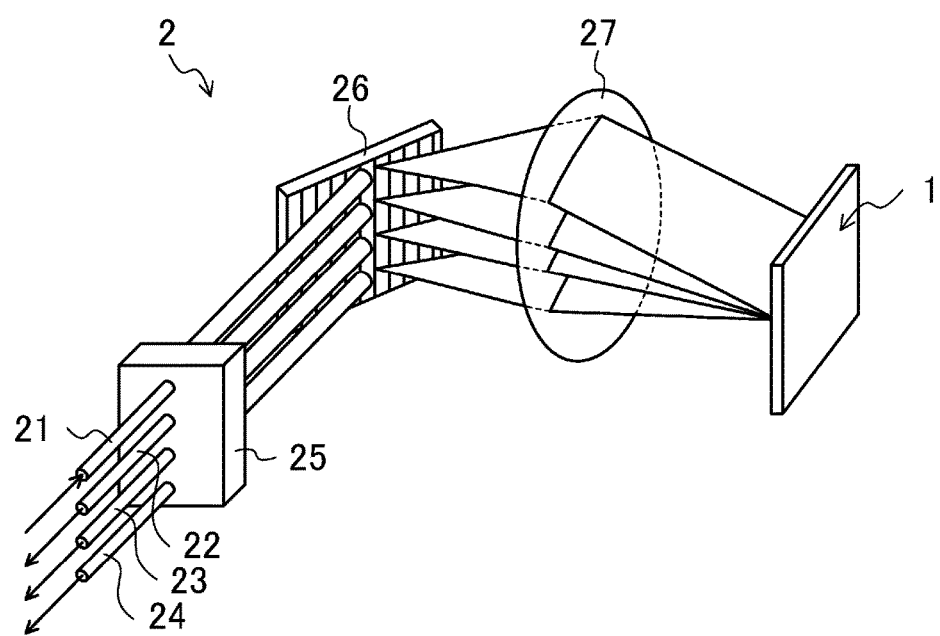
FIG. 3 is a schematic view of a wavelength selection switch.

This mirror array 1 is used by being incorporated into a wavelength selection switch 2, for example. FIG. 3 is a schematic view of the wavelength selection switch 2.

The wavelength selection switch 2 includes one input optical fiber 21, three output optical fibers 22-24, a collimator 25 provided for the optical fibers 21-24, a spectroscope 26 having a diffraction lattice, a lens 27, and the mirror array 1. In this example, only the three output optical fibers are used, but the number thereof is not limited thereto.

This wavelength selection switch 2 receives a plurality of optical signals having wavelengths different from one another through the input optical fiber 21. The collimator 25 collimates these optical signals. The spectroscope 26 splits the collimated optical signals into a predetermined number of optical signals having a specified wavelength. The splitted optical signals are collected by the lens 27 to enter the mirror array 1. The number of the splitted predetermined wavelengths corresponds to the number of the mirrors 131 in the mirror array 1. That is, the splitted optical signals having a specified wavelength enter the corresponding mirrors 131. The optical signals are reflected by the respective mirrors 131, and pass through the lens 27 again to enter the spectroscope 26. The spectroscope 26 combines the plurality of optical signals having different wavelengths together to output the combined signals to the output optical fibers 22-24. The mirror array 1 tilts the respective mirrors 131 to adjust reflection angles of the optical signals, and switches the output optical fibers 22-24 that receive the associated optical signals. The number of the mirror 131 may be more than that of the splitted wavelengths.

Operation of Mirror Array

Next, the operation of the mirror array 1 having such a configuration will be described.

Since the piezoelectric element 142 is formed on the actuator body 141, a warpage (hereinafter referred to as "initial warpage") may occur in the actuator 104 in a situation where no voltage is applied to the piezoelectric element 142. The mirror 131 is tilted due to this initial warpage. The initial warpage varies among the respective actuators 104. Thus, the respective mirrors 131 are tilted at different angles.

When the mirror array 1 is operated, a bias voltage is first applied to the piezoelectric element 142 to adjust the initial warpage. This allows for tilting the mirrors 131, 131, . . . , uniformly. Specifically, the controller 10 applies the bias voltage to the upper electrode 145 and the lower electrode 143. If the polarity of the bias voltage is the same as that of a voltage in a poling process, the piezoelectric element layer 144 contracts according to the bias voltage. This allows the surface of the actuator body 141 closer to the piezoelectric element 142 to contract. As a result, the warpage condition of the actuator body 141 is changed.

If the warpage condition of the actuator body 141 is changed, the tip end of the actuator body 141 is displaced. This also allows the first shorter side 131a of the mirror 131 to be displaced in a similar manner. The second shorter side 131b of the mirror 131 is hardly displaced because it is coupled to the base 102 through the second hinges 106. As a result, the mirror 131 is tilted such that the first shorter side 131a is displaced with the second hinges 106 serving as a supporting point.

The controller 10 adjusts the bias voltage based on the capacitance between the movable comb electrode 107 and the fixed comb electrode 108, which will be specifically described later, to tilt the mirrors 131, 131, . . . , uniformly.

In this manner, in the initial state, the bias voltage is applied to the piezoelectric element 142, and the mirrors 131, 131, . . . are tilted uniformly.

The controller 10 applies a driving voltage to a desired mirror device 100 in this state, thereby individually controlling the mirror 131. The mirror 131 is tilted according to the driving voltage as well as in a situation where the bias voltage is applied. That is, the mirror 131 is tilted about an A-axis that is parallel to the Y-axis, and substantially passes through the second hinges 106. At that time, the first hinge 105 is curved so as to be convex, and the second hinge 106 is curved so as to be concave.

Detection of Amount of Tilt of Mirror

When the actuator 104 is operated to tilt the mirror 131, the movable comb electrode 107 is also tilted with the tilting of the mirror 131. The movable comb electrode 107 is disposed on the opposite side of the mirror 131 from the second hinge 106. For example, when the mirror 131 is tilted so as to lift up the first shorter side 131a, the movable comb electrode 107 is tilted so as to lift down the electrode fingers 171. This changes the area where the electrode fingers 171 of the movable comb electrode 107 face the electrode fingers 181 of the fixed comb electrode 108, thereby changing the capacitance between the movable comb electrode 107 and the fixed comb electrode 108.

The controller 10 detects the capacitance between the movable comb electrode 107 and the fixed comb electrode 108 through the first detection terminal 122 and the second detection terminal 123. The controller 10 adjusts the voltage applied to the piezoelectric element 142 based on the change in the capacitance, thereby controlling the degree of tilt of the mirror 131.

At that time, the controller 10 also detects the capacitance of the reference electrode 194 through the first detection terminal 122 and the third detection terminal 125. Referring to the capacitance of the reference electrode 194, the controller 10 can obtain a change in the capacitance between the movable comb electrode 107 and the fixed comb electrode 108, more precisely.

A reduction in the area where the electrode fingers 171 face the electrode fingers 181 reduces the capacitance between the movable comb electrode 107 and the fixed comb electrode 108. If the capacitance becomes zero, the change in the capacitance cannot be detected, and a detection of the tilt of the mirror 131 cannot be made. Here, like the configuration of this embodiment, a ratio of each of dimensions of the electrode finger 171 and the electrode finger 181 in the thickness direction of the SOI substrate 109 to an interval between the electrode finger 171 and the electrode finger 181 is small. Such a configuration causes a fringe effect where the electric field expands in directions in addition to the direction in which the electrode finger 171 and the electrode finger 181 face each other. Therefore, even if the electrode finger 171 does not face the electrode finger 181, an electric field may occur between the electrode finger 171 and the electrode finger 181 in a situation where the electrode finger 171 and the electrode finger 181 are located close to each other. However, if the electrode finger 171 and the electrode finger 181 are spaced further from each other, the capacitance becomes zero. As a result, the degree of tilt of the mirror 131 cannot be detected. In other words, the degree of tilt of the mirror 131 can be precisely controlled only within the range where the capacitance between the movable comb electrode 107 and the fixed comb electrode 108 can be detected.

The movable comb electrode 107 is disposed closer to the second hinge 106 than to the first hinge 105. That is, the movable comb electrode 107 is disposed on or near the A-axis of the mirror 131. This reduces the amount of the displacement of the movable comb electrode 107 when the mirror 131 is tilted. As a result, this can extend the tilt range of the mirror 131 where the capacitance can be detected. That is, this can extend the tilt range of the mirror 131 where the degree of tilt of the mirror 131 can be precisely controlled.

In such a configuration, if the mirrors 131 are tilted at the same angle from a horizontal plane (e.g., the surface of the base 102), the same detection result of the capacitance is obtained regardless of whether the mirror 131 is tilted downward or upward. Therefore, in the operation of the above-described mirror array 1, the bias voltage and the driving voltage are set such that the mirror 131 is not moved across the horizontal plane when the mirror 131 is driven. That is, there are operations: (i) where the actuator 104 is curved downward so as to be under the horizontal plane due to the initial warpage, and is curved upward by the bias voltage so as to be over the horizontal plane and is curved more upward by the driving voltage; (ii) where the actuator 104 is curved upward so as to be over the horizontal plane due to the initial warpage, and is curved more upward by the bias voltage so as to be over the horizontal plane and is curved still more upward by the driving voltage; and (iii) where the actuator 104 is curved downward so as to be under the horizontal plane due to the initial curve, and is curved upward by the bias voltage within a range where the actuator 104 is under the horizontal plane and is curved more upward by the driving voltage within the range where the actuator 104 is under the horizontal plane (i.e., the actuator 104 is not curved upward so as to be over the horizontal plane). Such operations of the actuator 104 are examples.

Example of Operation of Mirror Device

An example of the operation of the mirror device will be described in detail as follows.

Figure 4:
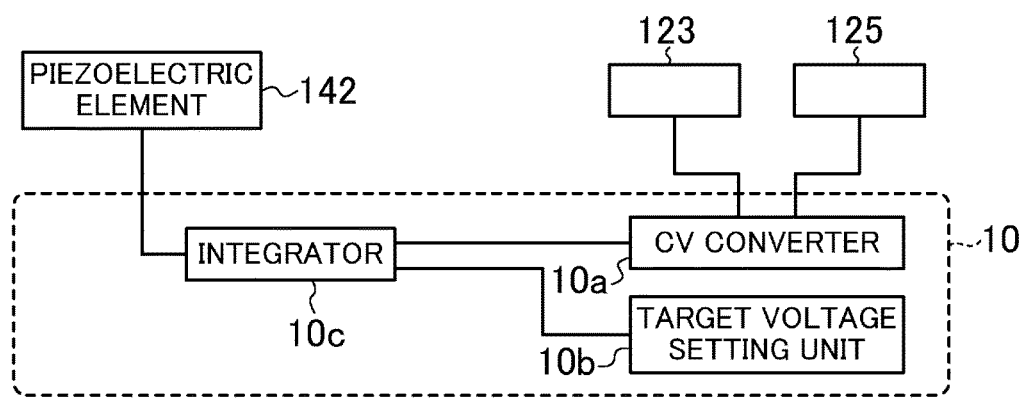
FIG. 4 is a schematic view of a mirror device.

FIG. 4 is a schematic view of the mirror device 100. The controller 10 at least includes a CV converter 10a, a target voltage setting unit 10b, and an integrator 10c. The CV converter 10a receives an output from the second detection terminal 123 and an output from the third detection terminal 125, and outputs an output signal according to the output to the integrator 10c. The target voltage setting unit 10b outputs an output signal according to a target tilt angle of the mirror 131 to the integrator 10c. The output signal from the target voltage setting unit 10b is consistent with the output signal output from the CV converter when the tilt angle of the mirror 131 reaches the target tilt angle. The integrator 10c outputs a driving voltage to be applied to the piezoelectric element 142. The integrator 10c feedback-controls the voltage applied to the piezoelectric element 142 such that the output signal from the CV converter 10a corresponds to the output signal from the target voltage setting unit 10b.

Figure 5:
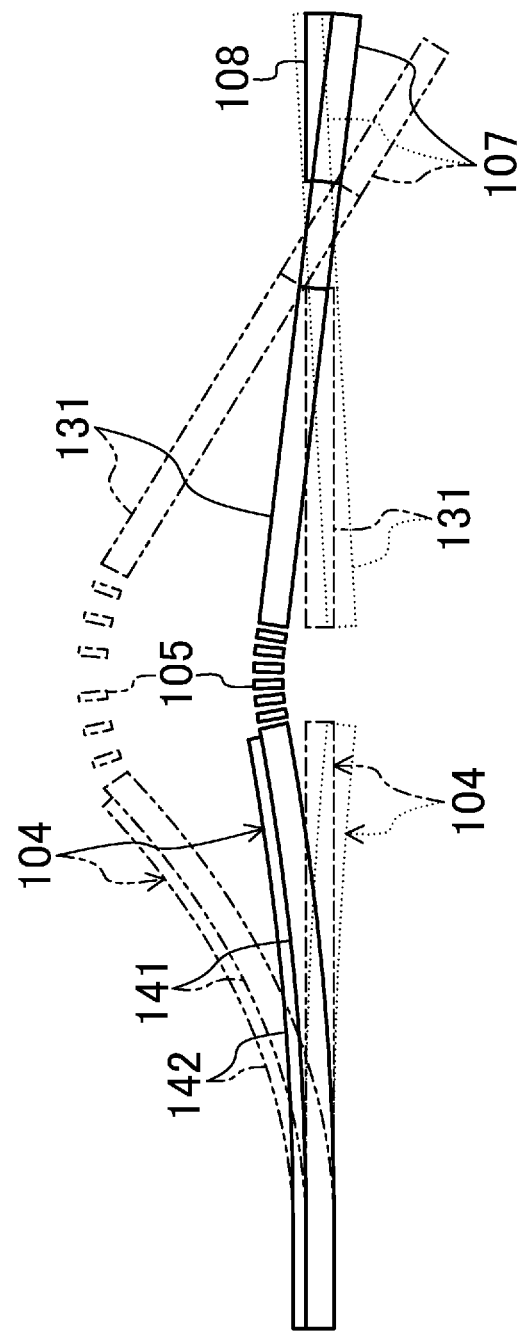
FIG. 5 is a cross-sectional view schematically illustrating a first example of the operation of the mirror device.

The above example (i) will be illustrated in FIG. 5. In FIG. 5, the dot-dash line shows a state where the actuator 104 and the mirror 131 are horizontally disposed. The dash line shows the initial state where the actuator 104 is curved due to the initial warpage. The solid line shows a state where the mirror 131 is tilted at a limiting angle closer to the initial state within a tilt range of the mirror 131. The dot-dot-dash line shows a state where the mirror 131 is tilted at a limiting angle further from the initial state within the tilt range of the mirror 131. In the dot-dash line and the dash line, the illustration of the first hinge 105 and the piezoelectric element 142 is omitted.

According to the example in FIG. 5, the actuator 104 is curved so as to be under the horizontal plane due to initial warpage. The controller 10 applies a drive voltage to the piezoelectric element 142 in use of the mirror device 100, thereby making the actuator 104 curved such that the actuator 104 is over the horizontal plane. The controller 10 adjusts the drive voltage to make the actuator 104 curved in the side over the horizontal plane. As a result, the mirror 131 is tilted.

Figure 6:
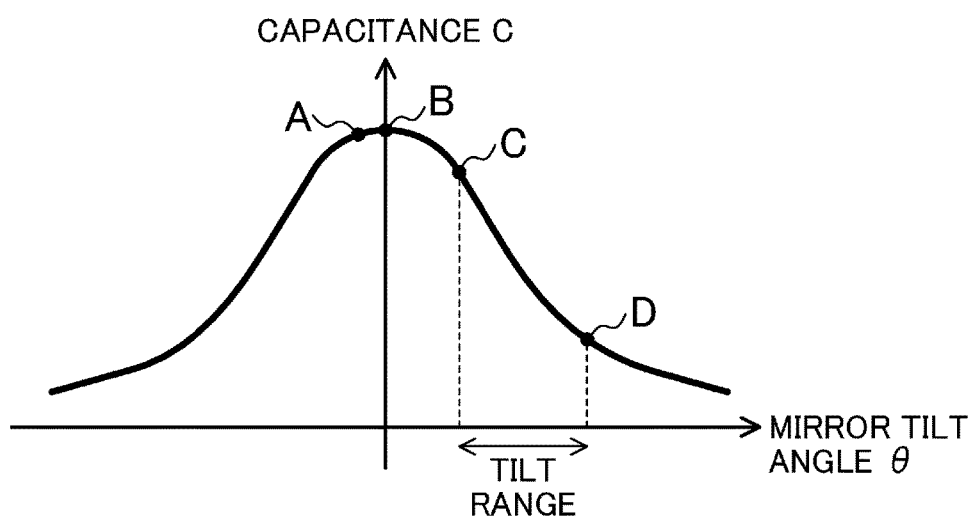
FIG. 6 is a diagram showing a change in capacitance relative to a mirror tilt angle in the first example of the operation.

The change in the capacitance at that time is shown in FIG. 6. Point A denotes the capacitance when the actuator 104 is in the initial state. Point B denotes the capacitance when the actuator 104 is in the horizontal state. Point C denotes the capacitance when the actuator 104 is in the state where the mirror 131 is tilted at a limiting angle closer to the initial state within the tilt range of the mirror 131. Point D denotes the capacitance when the actuator 104 is in the state where the mirror 131 is tilted at a limiting angle further from the initial state within the tilt range of the mirror 131. The tilt angle of the mirror 131 is positive when the mirror 131 moves to a position over the horizontal plane.

When the actuator 104 is in the horizontal state B, the area where the movable comb electrode 107 faces the fixed comb electrode 108 is maximum, and the capacitance has the maximum value. In the initial state A, the actuator 104 is curved downward toward a position slightly lower the horizontal plane. The capacitance in that state thus has a value slightly smaller than the maximum value.

The tilt range of the mirror 131 is set in a region on the opposite side from the initial state A with respect to the horizontal state B. The tilt range of the mirror 131 is a region where the capacitance monotonically decreases relative to the mirror tilt angle, and is set in a region where an absolute value of the gradient of the capacitance, that is, an absolute value of the rate of the change in the capacitance relative to the tilt angle of the mirror 131 (simply referred to as "the absolute value of the rate of the change in the capacitance"), is relatively large. Specifically, the absolute value of the rate of the change in the capacitance is larger in the state (point C) where the mirror is tilted at the limiting angle closer to the initial state A within the tilt range than in the initial state A. As a result, the tilt range is set in the region where the absolute value of the rate of the change in the capacitance is relatively large. Setting the relationship between the tilt range and the capacitance in such a manner increases the change in the capacitance relative to the mirror tilt angle, thereby being able to more precisely detect the mirror tilt angle.

For example, the rate of the change in the capacitance of the mirror 131 in a certain state is obtained as follows. The mirror 131 is tilted by a predetermined angle (e.g., ±0.5°, preferably ±0.1°) toward either side from a certain state. The rate of the change in the capacitance of the mirror 131 relative to the predetermined angle at that time can be regarded as the rate of the change in the capacitance of the mirror 131 in the certain state.

In the example in FIG. 5, suppose that the horizontal state where the capacitance has the maximum value is a reference state. The mirror 131 is tilted downward in the initial state, compared to the reference state. The controller 10 applies a voltage to the piezoelectric element 141 to tilt the mirror 131 upward, compared to the reference state, and to tilt the mirror 131 within the predetermined upper tilt range.

The initial warpage of the actuator 104 can be adjusted by a film stacked on the actuator body 141. For example, the initial warpage can be adjusted by adjusting the thickness of the $SiO_2$ layer 146 stacked on the surface of the actuator body 141 (the same side on which the mirror surface layer 133 of the mirror 131 is formed) or the thickness of the piezoelectric element 142. Alternatively, the initial warpage can be also adjusted by stacking a metal film made of, e.g., chromium, aluminum, or gold on the back surface of the actuator body 141 (a side opposite the mirror surface layer 133 of the mirror 131) through evaporation deposition or sputtering.

Figure 7:
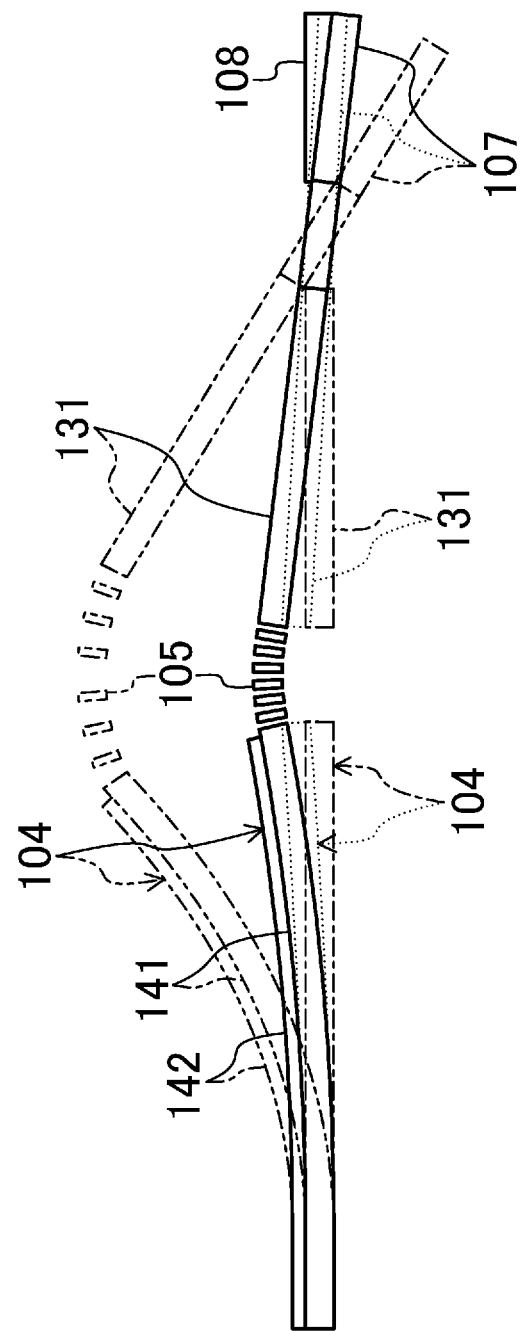
FIG. 7 is a cross-sectional view schematically illustrating a second example of the operation of the mirror device.

The above example (ii) will be illustrated in FIG. 7. In FIG. 7, the dot-dash line shows a state where the actuator 104 and the mirror 131 are horizontally disposed. The dash line shows the initial state where the actuator 104 is curved due to the initial warpage. The solid line shows a state where the mirror 131 is tilted at a limiting angle closer to the initial state within the tilt range of the mirror 131. The dot-dot-dash line shows a state where the mirror 131 is tilted at a limiting angle further from the initial state within the tilt range of the mirror 131. In the dot-dash line and the dash line, the illustration of the first hinge 105 and the piezoelectric element 142 is omitted.

According to the example in FIG. 7, the actuator 104 is curved so as to be over the horizontal plane due to initial warpage. The controller 10 applies a drive voltage to the piezoelectric element 142 in use of the mirror device 100, thereby making the actuator 104 curved more upward than in the initial state. The controller 10 adjusts the drive voltage to make the actuator 104 curved in the side over the horizontal plane. As a result, the mirror 131 is tilted.

Figure 8:
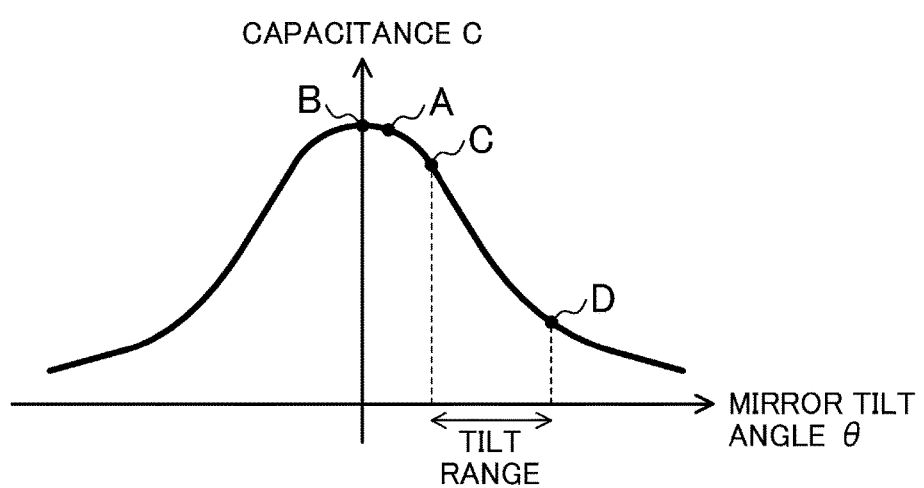
FIG. 8 is a diagram showing a change in capacitance relative to a mirror tilt angle in the second example of the operation.

The change in the capacitance at that time is shown in FIG. 8. Point A denotes the capacitance when the actuator 104 is in the initial state. Point B denotes the capacitance when the actuator 104 is in the horizontal state. Point C denotes the capacitance when the actuator 104 is in the state where the mirror 131 is tilted at the limiting angle closer to the initial state within the tilt range of the mirror 131. Point D denotes the capacitance when the actuator 104 is in the state where the mirror 131 is tilted at the limiting angle further from the initial state within the tilt range of the mirror 131. The tilt angle of the mirror 131 is positive when the mirror 131 moves to a position over the horizontal plane.

When the actuator 104 is in the horizontal state B, the area where the movable comb electrode 107 faces the fixed comb electrode 108 is maximum, and the capacitance has the maximum value. In the initial state A, the actuator 104 is curved upward so as to be slightly over the horizontal plane. The capacitance in that state thus has a value slightly smaller than the maximum value.

The tilt range of the mirror 131 is set on the same side as the initial state A relative to the horizontal state B. The tilt range of the mirror 131 is a region where the capacitance monotonically decreases relative to the mirror tilt angle, and is set in a region where the absolute value of the rate of the change in the capacitance is relatively large. Specifically, the absolute value of the rate of the change in the capacitance is larger in the state (point C) where the mirror is tilted at the limiting angle closer to the initial state A within the tilt range than in the initial state A. As a result, the tilt range is set in the region where the absolute value of the rate of the change in the capacitance is relatively large. Setting the relationship between the tilt range and the capacitance in such a manner increases the change in the capacitance relative to the mirror tilt angle, thereby being able to precisely detect the mirror tilt angle.

Figure 9:
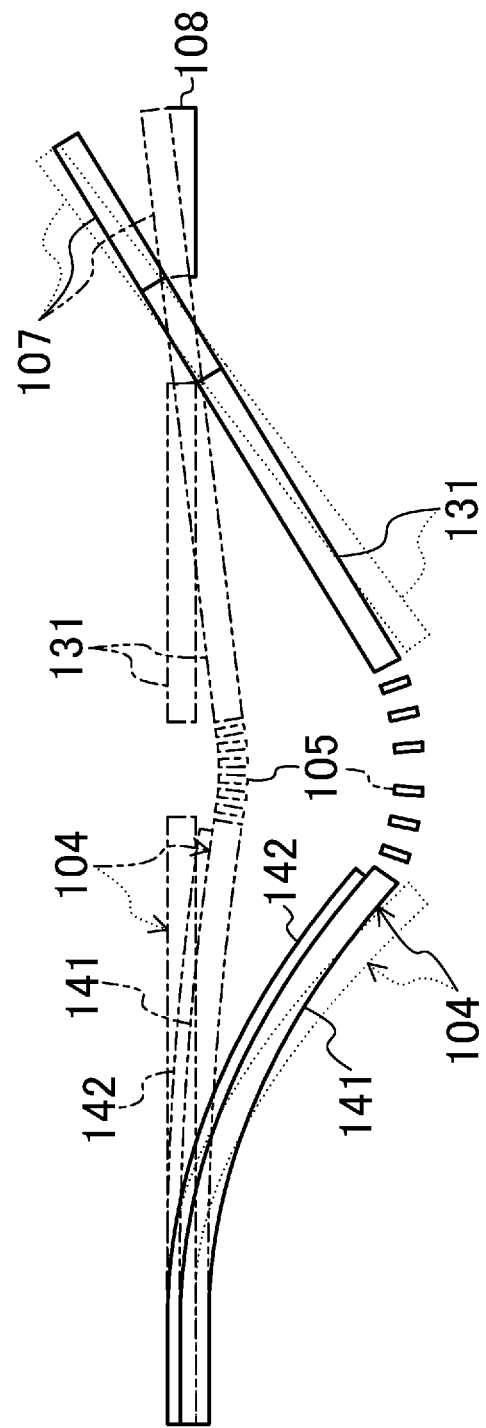
FIG. 9 is a cross-sectional view schematically illustrating a third example of the operation of the mirror device.

The above example (iii) will be illustrated in FIG. 9. In FIG. 9, the dot-dash line shows a state where the actuator 104 and the mirror 131 are horizontally disposed. The dash line shows the initial state where the actuator 104 is curved due to the initial warpage. The solid line shows a state where the mirror 131 is tilted at a limiting angle closer to the initial state within the tilt range of the mirror 131. The dot-dot-dash line shows a state where the mirror 131 is tilted at a limiting angle further from the initial state within the tilt range of the mirror 131. In the dot-dash line and the dash line, the illustration of the first hinge 105 and the piezoelectric element 142 is omitted.

According to the example in FIG. 9, the actuator 104 is curved downward so as to be under the horizontal plane due to initial warpage. The controller 10 applies a drive voltage to the piezoelectric element 142 in use of the mirror device 100, thereby making the actuator 104 curved more upward than in the initial state in the side under the horizontal plane. The controller 10 adjusts the drive voltage to make the actuator 104 curved in the side under the horizontal plane within the range between the state in the horizontal plane and the initial state. As a result, the mirror 131 is tilted.

Figure 10:
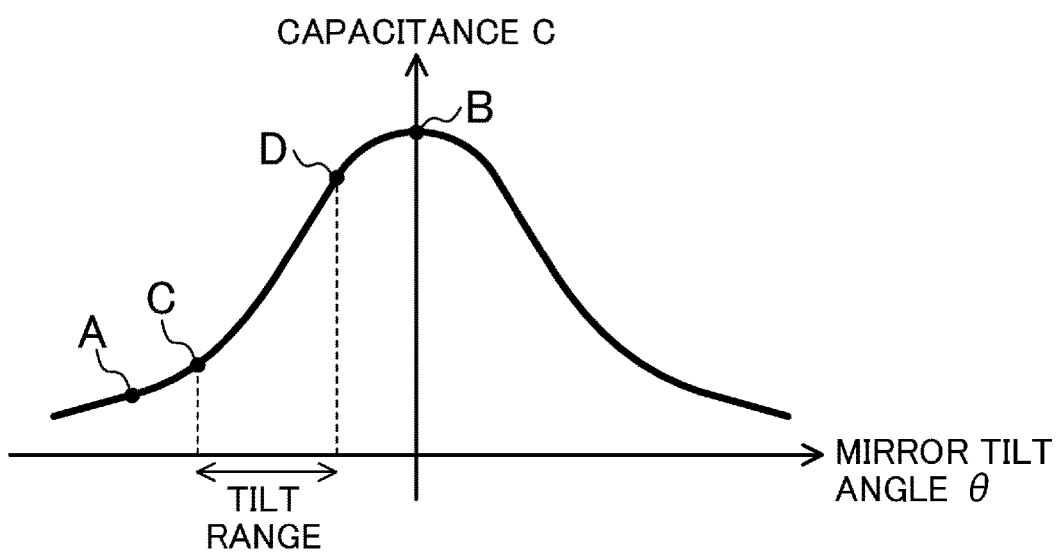
FIG. 10 is a diagram showing a change in capacitance relative to a mirror tilt angle in the third example of the operation.

The change in the capacitance at that time is shown in FIG. 10. Point A denotes the capacitance when the actuator 104 is in the initial state. Point B denotes the capacitance when the actuator 104 is in the horizontal state. Point C denotes the capacitance when the actuator 104 is in the state where the mirror 131 is tilted with the limiting angle closer to the initial state within the tilt range of the mirror 131. Point D denotes the capacitance when the actuator 104 is in the state where the mirror 131 is tilted with the limiting angle further from the initial state within the tilt range of the mirror 131. The tilt angle of the mirror 131 is positive when the mirror 131 moves to a position over the horizontal plane.

When the actuator 104 is in the horizontal state B, the area where the movable comb electrode 107 faces the fixed comb electrode 108 is maximum, and the capacitance has the maximum value. In the initial state A, the actuator 104 is curved far downward under the horizontal plane. The capacitance in that state has a small value.

The tilt range of the mirror 131 is set in the same side as the initial state A relative to the horizontal state B. The tilt range of the mirror 131 is a region where the capacitance monotonically increases relative to the mirror tilt angle, and is set in a region where the absolute value of the rate of the change in the capacitance is relatively large. Specifically, the absolute value of the rate of the change in the capacitance is larger in the state (point C) where the mirror is tilted at the limiting angle closer to the initial state A within the tilt range than in the initial state A. As a result, the tilt range is set in the region where the absolute value of the rate of the change in the capacitance is relatively large. Setting the relationship between the tilt range and the capacitance in such a manner increases the change in the capacitance relative to the mirror tilt angle, thereby being able to precisely detect the mirror tilt angle.

Configuration of First Hinge

Figure 11:
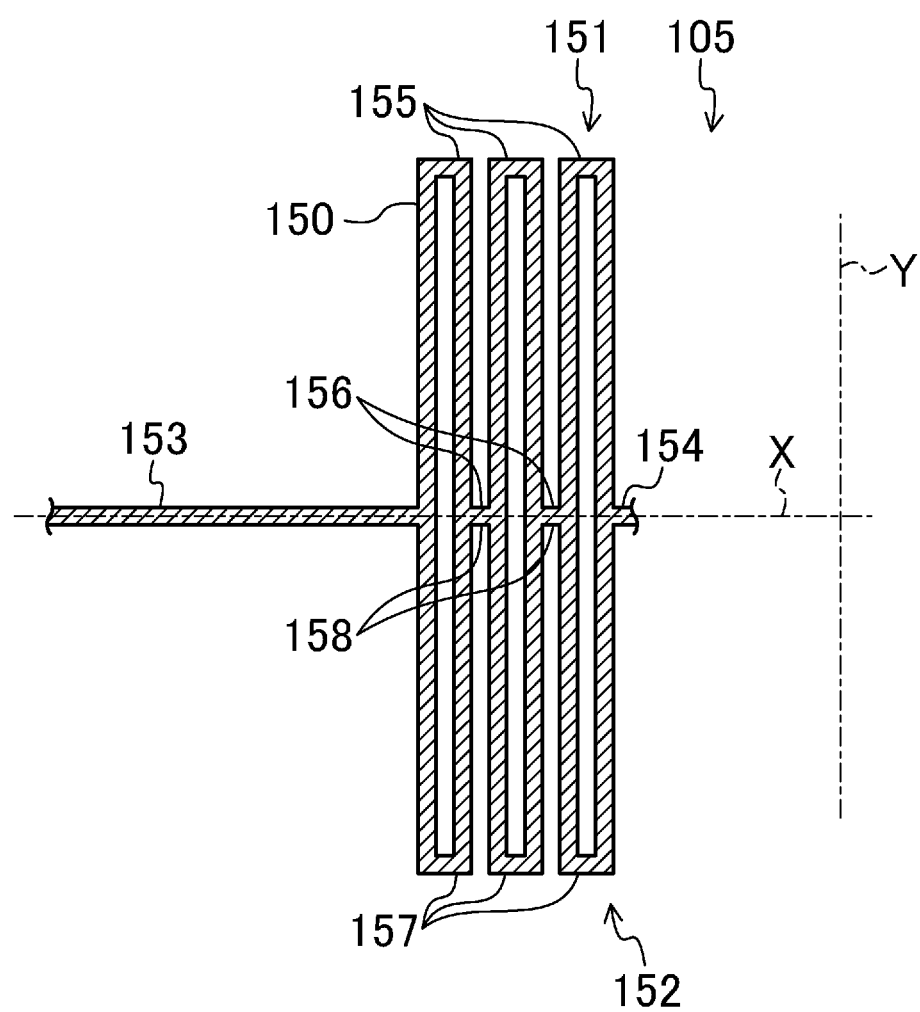
FIG. 11 is a plan view of a first hinge.

Next, the configuration of the first hinge 105 will be described in detail. FIG. 11 is a plan view of the first hinge 105.

The first hinge 105 includes a meandering portion 150, a first end 153, and a second end 154. The meandering portion 150 has a pair of a first meandering portion 151 and a second meandering portion 152. The first meandering portion 151 and the second meandering portion 152 are symmetric about the X-axis. One end of the first meandering portion 151 and one end of the second meandering portion 152 are coupled to the first end 153. The other end of the first meandering portion 151 and the other end of the second meandering portion 152 are coupled to the second end 154. The first end 153 is coupled to the actuator (not shown in the figure). The second end 154 is coupled to the mirror (not shown in the figure).

The first meandering portion 151 has three first protrusions 155, 155, . . . and two first recesses 156, 156 which are alternately disposed, and has a zig-zag or serpentine configuration. The first meandering portion 151 meanders in the Y-axis direction and extends from the first end 153 to the second end 154 in the X-axis direction. Each of the first protrusion 155 and the first recess 156 is rectangular-shaped. The first protrusion 155 extends outward in the Y-axis direction, and makes two right-angled turns. Then, it extends inward in the Y-axis direction. The first recess 156 extends inward in the Y-axis direction, and makes two right-angled turns. Then, it extends outward in the Y-axis direction.

The second meandering portion 152 has three second protrusions 157, 157, . . . and two second recesses 158, 158 which are alternately disposed, and has a zig-zag or serpentine configuration. The second meandering portion 152 meanders in the Y-axis direction and extends from the first end 153 to the second end 154 in the X-axis direction. Each of the second protrusion 157 and the second recess 158 is rectangular-shaped. The second protrusion 157 extends outward in the Y-axis direction, and makes two right-angled turns. Then, it extends inward in the Y-axis direction. The second recess 158 extends inward in the Y-axis direction, and makes two right-angled turns. Then, it extends outward in the Y-axis direction.

The two first recesses 156, 156 are respectively coupled to the two second recesses 158, 158. That is, the first meandering portion 151 and the second meandering portion 152 are coupled together not only at the both ends thereof but also at the first recesses 156 and the second recesses 158.

In other words, the first hinge 105 has a plurality of annular portions aligned in the X-axis direction, and couplers coupling the annular portions together. The annular portion is longer in the Y-axis direction than in the X-axis direction.

In this manner, the first recesses 156, 156, . . . of the first meandering portion 151 are coupled to the respective second recesses 158, 158, . . . of the second meandering portion 152. This can increase stiffness (spring constant) in the Y-axis direction with the stiffness in the X-axis direction mostly unchanged.

Specifically, the meandering portion 150 has extends in the X-axis direction in a zig-zag or serpentine configuration, thereby being able to reduce the stiffness in the X-axis direction. The effect that can reduce the stiffness in the X-axis direction is almost maintained even if the first recesses 156, 156, . . . are coupled to the respective second recesses 158, 158, . . . .

On the other hand, coupling the first recesses 156, 156, . . . to the respective second recesses 158, 158, . . . restricts deformation of the first hinge 105 when a force is applied to the Y-axis direction. That is, unless the first recesses 156, 156, . . . and the respective second recesses 158, 158, . . . are coupled together, the position of each of the first recesses 156 and the position of an associated one of the second recesses 158 in the X-axis direction are displaced in a situation where a force in the Y-axis direction is applied to the first hinge 105. This displacement alters an interval between adjacent two of the first protrusions 155, 155, an interval between adjacent two of the first recesses 156, 156, an interval between adjacent two of the second protrusions 157, 157, and an interval between adjacent two of the second recesses 158, 158. As a result, the first hinge 105 is deformed in the Y-axis direction. On the other hand, coupling the first recesses 156, 156, . . . to the respective second recesses 158, 158, . . . prevents displacement of the first recess 156 and the corresponding second recess 158 in the X-axis direction. This also hardly alters, e.g., the interval between adjacent two of the first protrusions 155, 155, thereby preventing deformation of the entire first hinge 105 in the Y-axis direction. As a result, the stiffness of the first hinge 105 in the Y-axis direction is increased.

Relationship between Adjacent Ones of First Hinges

The first hinge 105 having such a configuration partially overlaps another first hinge 105 adjacent to this first hinge 105 in the Y-axis direction when viewed from the first end 153 toward the second end 154. That is, as illustrated in FIG. 1, regarding two adjacent first hinges 105, 105, at least a portion of the meandering portion 150 of one first hinge 105 protrudes toward the other first hinge 105 across a middle line L between the two first hinges 105 in a predetermined first region R1. On the other hand, in a second region R2 different from the first region R1, at least a portion of the meandering portion 150 of the other first hinge 105 protrudes toward the one first hinge 105 across the middle line L. The middle line L refers to a straight line extending parallel to the X-axis in the middle between the one first hinge 105 and the other first hinge 105.

Specifically, in a first one of the first hinges 105 aligned in the Y-axis direction, the first end 153 is longer than a second end 154, and the meandering portion 150 is closer to the mirror 131 than to the actuator 104. In a second one of the first hinges 105, the second end 154 is longer than the first end 153, and the meandering portion 150 is closer to the actuator 104 than to the mirror 131. In this manner, the position in the X-axis direction differs between the meandering portion 150 of the first one of the first hinges 105 and the meandering portion 150 of the second one of the first hinges 105.

In the first region R1 closer to the mirror, the meandering portion 150 of the first one of the first hinges 105 protrudes toward the second one of the first hinges 105 across the middle line L. On the other hand, in the second region R2 closer to the actuator, the meandering portion 150 of the second one of the first hinges 105 protrudes toward the first one of the first hinges 105 across the middle line L.

Odd-numbered first hinges 105 counted from its end in the Y-axis direction have a configuration same as or similar to that of the first one of the first hinges 105. On the other hand, even-numbered first hinges 105 counted from its end in the Y-axis direction have a configuration same as or similar to that of the second one of the first hinges 105. The position of the meandering portion 150 of each of the odd-numbered first hinges 105 is shifted from that of an associated one of the even-numbered first hinges 105 in the X-axis direction. As a result, the length of the meandering portions 150 in the Y-axis direction is increased.

The increase in the length of the first hinges 105 in the Y-axis direction increases the length of a linear portion (hereinafter referred as "transverse linear portion") of the meandering portion 150 extending in the Y-axis direction. The increase in the length of the transverse linear portion can reduce the stiffness of the first hinge 105 in the X-axis direction. On the other hand, even if the transverse linear portion is made longer, the stiffness of the first hinge 105 in the Y-axis direction is not reduced so much.

Stiffness of First Hinge and Stiffness of Second Hinge

Next, the stiffness of the first hinge 105 and that of the second hinge 106 will be described.

The stiffness of the second hinge 106 is higher than that of the first hinge 105. Specifically, the stiffness of the second hinge 106 in the X-axis direction is higher than that of the first hinge 105 in the X-axis direction. This allows for preventing displacement of the movable comb electrode 107 in the X-axis direction when the mirror 131 is tilted. That is, the shape of the base 102 is not altered, and therefore, the first hinge 105 and the second hinge 106 have to extend in the X-axis direction in order to curve the actuator 104 to tilt the mirror 131. At that time, if the stiffness of the second hinge 106 is smaller than that of the first hinge 105, the mirror 131 is greatly displaced toward the actuator 104. Then, the movable comb electrode 107 is also displaced toward the actuator 104, thereby causing a change in the capacitance between the movable comb electrode 107 and the fixed comb electrode 108. That is, the capacitance between the movable comb electrode 107 and the fixed comb electrode 108 is changed by a cause other than the tilting of the movable comb electrode 107 with the tilting of the mirror 131. On the other hand, if the stiffness of the second hinge 106 in the X-axis direction is higher than that of the first hinge 105 in the X-axis direction, the first hinge 105 extends more than the second hinge 106 does. This reduces the displacement of the mirror 131 toward the actuator 104. As a result, this can prevent the change in the capacitance by a cause other than the tilting of the movable comb electrode 107 with the tilting of the mirror 131.

Summary

Accordingly, the mirror device 100 includes: the mirror 131; the actuator 104 having the piezoelectric element 142 and tilting the mirror 131; the first hinge 105 coupling the mirror 131 to the actuator 104; the base 102; the second hinge 106 coupling the mirror 131 to the base 102; the movable comb electrode 107 coupled to the mirror 131; and the fixed comb electrode 108 fixed to the base 102, and facing the movable comb electrode 107. The actuator 104 is controlled based on the capacitance between the movable comb electrode 107 and the fixed comb electrode 108. The movable comb electrode 107 is disposed on a portion of the mirror 131 closer to the second hinge 106 than to the first hinge 105.

This configuration can precisely control the degree of tilt of the mirror 131. In addition, this configuration can extend the range where the degree of tilt of the mirror 131 can be precisely detected.

Specifically, the movable comb electrode 107 is displaced integrally with the mirror 131. Thus, detecting the capacitance between the movable comb electrode 107 and the fixed comb electrode 108 enables detection of the degree of tilt of the mirror 131. As a result, even if the actuator 104 using the piezoelectric element 142 has hysteresis and creep characteristics, tilt of the mirror 131 can be precisely controlled with reference to the capacitance between the movable comb electrode 107 and the fixed comb electrode 108.

At that time, there may be a situation where the movable comb electrode 107 is far from the center of tilt of the mirror 131, i.e., the A-axis. In such a situation, the movable comb electrode 107 is significantly displaced when the mirror 131 is tilted. Too large amount of displacement of the movable comb electrode 107 according to the tilt of the mirror 131 reduces the tilt range of the mirror 131 where the capacitance between the movable comb electrode 107 and the fixed comb electrode 108 can be detected. In other words, the range where the tilt of the mirror 131 can be precisely controlled becomes narrower. That is, disposing the movable comb electrode 107 at a position closer to the second hinge 106 serving as the center of tilt of the mirror 131 can reduce the amount of the displacement of the movable comb electrode 107 according to the tilt of the mirror 131. As a result, this enables extension of the range where the tilt of the mirror 131 can be precisely controlled.

The movable comb electrode 107 and the fixed comb electrode 108 are implemented as detection electrodes. This allows for easily forming the detection electrodes using the capacitance. Specifically, the movable comb electrode 107 and the fixed comb electrode 108 are comprised of the same first silicon layer 191. That is, formation of the movable comb electrode 107 and the fixed comb electrode 108 allows for determining the interval between the movable comb electrode 107 and the fixed comb electrode 108. If the movable comb electrode 107 and the fixed comb electrode 108 are independently formed and assembled, alignment with high precision is needed in the assembling. In contrast, if the movable comb electrode 107 and the fixed comb electrode 108 are comprised of the same substrate, the interval between the movable comb electrode 107 and the fixed comb electrode 108 is formed with high precision by a semiconductor process. Thus, the detection electrodes by the capacitance can be easily formed.

The movable comb electrode 107 is disposed on the opposite side of the mirror 13 from the actuator 104.

This configuration allows for aligning the actuator 104, the mirror 131, and the movable comb electrode 107. As a result, the mirror device 100 can have a reduced size. In particular, this configuration allows for reducing the size of the mirror device 100 in the direction orthogonal to the direction in which these elements are aligned, i.e., the Y-axis direction.

Stiffness of the second hinge 106 is higher than that of the first hinge 105.

According to this configuration, when the actuator 104 is curved and the mirror 131 is tilted, the positional relationship between the mirror 131 and the base 102 is not significantly changed, compared with the change in the positional relationship between the actuator 104 and the mirror 131. Therefore, the positional relationship between the movable comb electrode 107 coupled to the mirror 131 and the fixed comb electrode 108 fixed to the base 102 is not significantly changed, either. As a result, this can reduce the change in the capacitance between the movable comb electrode 107 and the fixed comb electrode 108 due to a cause other than the tilt of the movable comb electrode 107 according to the tilt of the mirror 131 as quickly as possible. This enables precise control of tilt of the mirror 131.

The mirror 131, the second hinge 106, and the movable comb electrode 107 are arranged in sequence.

This configuration allows for aligning the mirror 131, the second hinge 106, and the movable comb electrode 107 with a reduced space.

The mirror 131 includes a plurality of the mirrors 131. The actuator 104 includes a plurality of actuators 104. The first hinge 105 includes a plurality of first hinges 105. The second hinge 106 includes a plurality of second hinges 106. The movable comb electrode 107 includes a plurality of movable comb electrodes 107. The mirrors 131 are disposed in the predetermined Y-axis direction. Each of the mirrors 131 is provided with at least associated one of the actuators 104, at least associated one of the first hinges 105, at least associated one of the second hinges 106, and at least associated one of the movable comb electrodes 107. The at least associated one of the actuators 104, the at least associated one of the first hinges 105, the mirror 131, the at least associated one of the second hinges 106, and the at least associated one of the movable comb electrodes 107 are disposed in sequence in the direction orthogonal to the Y-axis direction, i.e., in the X-axis direction. The mirror 131 is tilted about the A-axis parallel to the predetermined Y-axis direction.

According to this configuration, the plurality of mirrors 131, 131, . . . are disposed in the Y-axis direction. The actuator 104, the first hinge 105, the mirror 131, the second hinge 106, and the movable comb electrode 107 are disposed in sequence in the X-axis direction. This allows for reducing the size of the mirror device 100 in the Y-axis direction. The mirror device 100 has a reduced size in the Y-axis direction, thereby being able to densely dispose the plurality of the mirrors 131, 131, . . . in the Y-axis direction. As a result, the mirror array 1 can has a reduced size. If the mirror array 1 is applied to the wavelength selection switch 2, there may be a situation where the intervals each of which is provided between adjacent two of the plurality of the mirrors 131, 131, . . . is larger. In that situation, loss is increased when splitted optical signals are reflected on the mirror array 1. According to this configuration, the plurality of the mirrors 131, 131, . . . can be densely disposed, thereby being able to reduce the loss of the optical signals.

The partition wall 102b is provided between adjacent two of the fixed comb electrodes 108, 108 of the adjacent two of the mirror devices 100, 100. In other words, the adjacent fixed comb electrodes 108, 108 are isolated from the partition wall 102b.

This thus allows for preventing an electric field between the movable comb electrode 107 and the fixed comb electrode 108 in one mirror device 100 from affecting an electric field between the movable comb electrode 107 and the fixed comb electrode 108 in the other mirror device 100. This enables precise detection of the capacitance between the movable comb electrode 107 and the fixed comb electrode 108. In particular, the movable comb electrode 107 is displaced below the fixed comb electrode 108 in the mirror device 100. It is thus effective to provide the partition wall 102b below the fixed comb electrode 108.

A shield wall 195 is provided between adjacent two of the electrode portions 124, 124. As a result, this prevents the adjacent two of the electrode portions 124, 124 from serving as capacitors, and storing an electric charge therein, and also prevents the stored electric charge from causing an effect on an output from each of the electrode portions 124. The shield wall 195 does not to have to be continuously provided and may be intermittently provided.

In the same or similar manner, a shield wall 196 is provided between adjacent two of the electrode portions 126, 126. As a result, this prevents the adjacent two of the electrode portions 126, 126 from serving as capacitors, and storing an electric charge therein, and also prevents the stored electric charge from causing an effect on an output from each of the electrode portions 126. The shield wall 196 does not to have to be continuously provided and may be intermittently provided.

The electrode fingers 171 of the movable comb electrode 107 and the electrode fingers 181 of the fixed comb electrode 108 extend parallel to the longitudinal direction of the actuator 104.

According to this configuration, the electrode fingers 171 and the electrode fingers 181 extends in a direction orthogonal to the longitudinal direction of the actuator 104, in other words, orthogonal to an axis which is to be a reference when the actuator 104 is curved. When the actuator 104 is curved, the mirror 131 may be displaced in the longitudinal direction of the actuator 104. With this displacement, the electrode fingers 171 may also be displaced in the longitudinal direction of the actuator 104. The electrode fingers 171 and the electrode fingers 181 extend in the longitudinal direction of the actuator 104. This prevents the electrode fingers 171 from coming into contact with the electrode fingers 181 when the electrode fingers 171 are displaced in the longitudinal direction of the actuator 104.

The first hinge 105 has the first meandering portion 151 having a zig-zag or serpentine configuration where the plurality of first protrusions 155 and the plurality of first recesses 156 are alternately disposed, and extending from one end to the other end in a meandering manner. The first hinge 105 also has the second meandering portion 152 having a zig-zag or serpentine configuration where the plurality of second protrusions 157 and the plurality of second recesses 158 are alternately disposed, disposed together with the first meandering portion 151, and extending from one end to the other end in a meandering manner. At least ones of the first recesses 156 are coupled to at least respective ones of the second recesses 158.

According to this configuration, each of the first meandering portion 151 and the second meandering portion 152 has a zig-zag or serpentine configuration where the protrusions and recesses are alternately disposed, and extends from one end to the other end in a meandering manner. This can relatively reduce the stiffness of the first hinge 105 in the direction linking the one end to the other end, i.e., the X-axis direction. The relative reduction in the stiffness of the first hinge 105 in the X-axis direction allows for easily deforming the first hinge 105 when the mirror 131 is displaced. That is, when the mirror 131 is displaced, the first hinge 105 has to be curved. Higher stiffness of the first hinge 105 in the X-axis direction allows the first hinge 105 to serve as an obstacle to displacement of the mirror 131. On the other hand, if the stiffness of the first hinge 105 in the X-axis direction is lower, the first hinge 105 tends to expand or contract easily in the X-axis direction. If the first hinge 105 tends to expand or contract in the X-axis direction, the first hinge 105 also tends to be curved easily. That is, easy expansion or contraction in the X-axis direction leads to easily curving the hinge. As a result, the mirror 131 can be easily displaced. This allows for reducing a voltage for driving the actuator 104.

In addition, at least ones of the first recesses 156 of the first meandering portion 151 are coupled to at least respective ones of the second recesses 158 of the first meandering portion 151. This relatively increases the stiffness of the first hinge 105 in the direction in which the first meandering portion 151 and the second meandering portion 152 meander, i.e., in the Y-axis direction, compared with a configuration in which the first recesses 156 and second recesses 158 can be freely displaced. The relative increase in the stiffness of the first hinge 105 in the Y-axis direction allows for preventing the mirror 131 from hitting against vicinity members.

In this manner, one hinge has lower stiffness in the X-axis direction while having higher stiffness in the Y-axis direction.

The first hinge 105 has the meandering portion 150 extending from the first end 153 to the second end 154 in a meandering manner in the Y-axis direction. Regarding two adjacent first hinges 105, 105, the meandering portion 150 of one first hinge 105 protrudes toward the other first hinge 105 across a middle line L between the two first hinges 105 in the predetermined first region R1. In the second region R2 different from the first region R1, the meandering portion 150 of the other first hinge 105 protrudes toward the one first hinge 105 across the middle line L.

According to this configuration, the meandering portion 150 (specifically, the second meandering portion 152) of one of the two adjacent first hinges 105, 105 protrudes toward the other first hinge 105 across the middle line L in the first region R1. On the other hand, in the second region R2, the meandering portion 150 (specifically, the first meandering portion 151) of the other first hinge 105 protrudes toward the one first hinge 105 across the middle line L. That is, the two adjacent first hinges 105, 105 partially overlap each other when viewed from the first end 153 toward the second end 154. This allows for increasing the length of the first hinge 105 in the Y-axis direction. The length of the first hinge 105 in the Y-axis direction affects more on the stiffness in the X-axis direction than that in the Y-axis direction. That is, the increase in the first hinge 105 in the Y-axis direction allows for effectively reducing the stiffness of the first hinge 105 in the X-axis direction without significantly reducing the stiffness in the Y-axis direction.

The relative reduction in the stiffness of the first hinge 105 in the X-axis direction allows for easily deforming the first hinge 105 when the mirror 131 is displaced. As a result, the mirror 131 can be easily deformed, and a voltage for driving the actuator 104 can be reduced. The relative increase in the stiffness of the first hinge 105 in the Y-axis direction allows for preventing the mirror 131 from hitting against vicinity members.

The mirror device 100 includes: the mirror 131; the actuator 104 having the piezoelectric element 142 and tilting the mirror 131; the first hinge 105 coupling the mirror 131 to the actuator 104; the base 102; the second hinge 106 coupling the mirror 131 to the base 102; the movable comb electrode 107 coupled to the mirror 131; the fixed comb electrode 108 fixed to the base 102, and facing the movable comb electrode 107; and the controller 10 applying a voltage to the piezoelectric element 142 based on the capacitance between the movable comb electrode 107 and the fixed comb electrode 108 to control the actuator 104. The controller 10 controls the actuator 104 such that the mirror 131 is tilted within a predetermined tilt range where the capacitance monotonically increases or decreases. The absolute value of the rate of the change in the capacitance relative to the tilt angle of the mirror 131 is larger in the state where the mirror 131 is tilted at a limiting angle closer to the initial state, where no voltage is applied to the mirror 131, within the tilt range than in the initial state.

According to this configuration, the absolute value of the rate of the change in the capacitance relative to the tilt angle of the mirror 131 is larger at least in the state where the mirror 131 is tilted at the limiting angle closer to the initial state within the tilt range than in the initial state of the mirror 131. The tilt range of the mirror 131 can be thus set in a region where the absolute value of the rate of the change in the capacitance is relatively large. This increases the change in the capacitance relative to the tilt of the mirror 131, thereby being able to more precisely detect the tilt angle of the mirror 131.

The mirror device 100 includes: the mirror 131; the actuator 104 having the piezoelectric element 142 and tilting the mirror 131; the first hinge 105 coupling the mirror 131 to the actuator 104; the base 102; the second hinge 106 coupling the mirror 131 to the base 102; the movable comb electrode 107 coupled to the mirror 131; the fixed comb electrode 108 fixed to the base 102, and facing the movable comb electrode 107; and the controller 10 applying a voltage to the piezoelectric element 142 based on the capacitance between the movable comb electrode 107 and the fixed comb electrode 108 to control the actuator 104. The mirror 131 is tilted in an initial position where no voltage is applied to the piezoelectric element 142 compared with a reference position where the capacitance reaches the maximum value. The controller 10 applies a voltage to the piezoelectric element 142 to tilt the mirror 131 toward the opposite side of the reference position from the initial position within a predetermined tilt range on the opposite side.

According to this configuration, whether the mirror 131 is tilted from the reference position toward one side or toward the other side, the capacitance between the movable comb electrode 107 and the fixed comb electrode 108 is the same in either situation as long as the absolute value of the tilt angle is the same. That is, it is difficult to determine the side toward which the mirror 131 is tilted from the reference position based on only the capacitance. Therefore, the tilt range of the mirror 131 is limited to only one side from the reference position. This enables avoiding the problem in which a determination cannot be made whether the mirror 131 is tilted from the reference position toward one side or toward the other side. In addition, the tilt range of the mirror 131 is set on the opposite side of the reference position from the initial position. As a result, the tilt range of the mirror 131 can be set regardless of the initial state. That is, flexibility can be improved in setting the tilt range of the mirror 131, and in addition, the tilt range can be broadened.

Modification of Mirror Array

Figure 12:
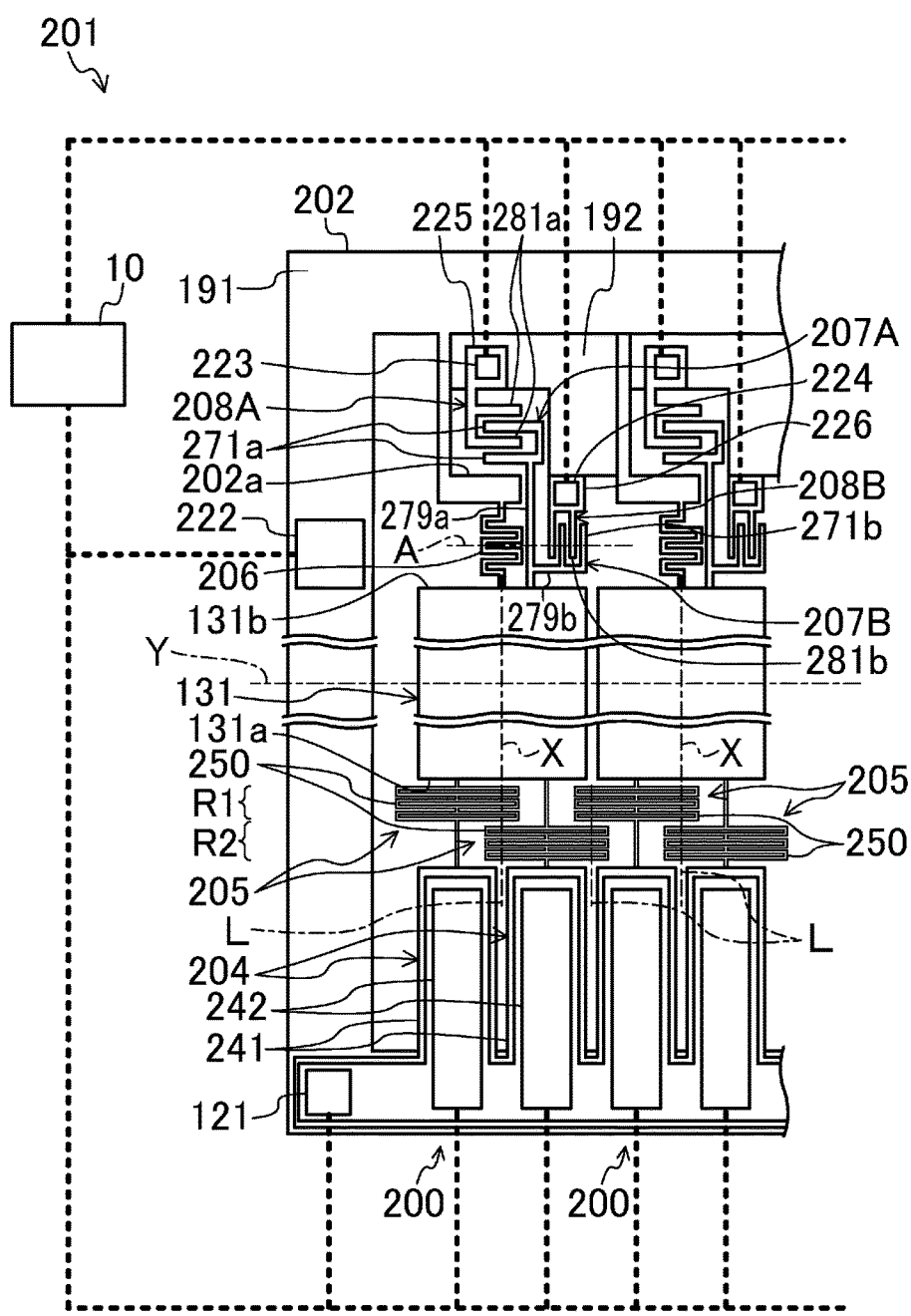
FIG. 12 is a plan view of a modification of the mirror array.

Next, a modification of the mirror array 1 will be described. FIG. 12 is a plan view of the mirror array 201. The mirror array 201 according to the modification is different from the mirror device 100 in the configuration of the mirror device 200. Here, parts of the configuration of the mirror array 201 different from the mirror array 1 will be mainly described. A part of the elements peculiar to the modification may be described with reference characters in the 200 series. The elements having the same or similar configuration as or to those in the mirror array 1 are denoted by the same two- and one-digit numbers and the same symbol.

The mirror array 201 includes a plurality of mirror devices 200, 200, . . . . The mirror device 200 includes: a base 202; a mirror 131; two actuators 204, 204 for driving the mirror 131; two first hinges 205, 205 coupling the mirror 131 to the actuators 204; a second hinge 206 coupling the mirror 131 to the base 202; a first movable comb electrode 207A and a second movable comb electrode 207B provided for the mirror 131; a first fixed comb electrode 208A and a second fixed comb electrode 208B provided for the base 202; and a controller 10. The mirror device 200 drives the mirror 131 using the two actuators 204, 204. In the mirror array 201, some of the mirror devices 200, 200, . . . share one controller 10. In the mirror array 201, each mirror device 200 may be provided with one controller 10, or all the mirror devices 200, 200, . . . may share one controller 10.

The basic configuration of the actuator 204 is the same as that of the actuator 104 in the first embodiment. The piezoelectric element 242 is stacked on the surface of the actuator body 241.

The tip end of the actuator body 241 is coupled to the mirror 131 through the first hinges 205. The respective two first hinges 205, 205 are coupled to a first shorter side 131a of the mirror 131 in positions symmetric about an X-axis. Each of the first hinges 205 has a pair of two meandering portions. Each of the meandering portions has protrusions and recesses alternately disposed. The recesses of the two meandering portions are coupled together.

One mirror device 200 has two first hinges 205, 205. In one first hinge 205, the meandering portion 250 is provided adjacent to the mirror 131. In the other first hinge 205, the meandering portion 250 is provided adjacent to the actuator 204. In a first region R1, the meandering portion 250 of the one first hinge 205 at least partially protrudes toward the other first hinge 205 across the middle line L between the two first hinges 205, 205. In a second region R2, the meandering portion 250 of the other first hinge 205 at least partially protrudes toward the one first hinge 205 across the middle line L.

There are two adjacent first hinges 205, one of which is provided for one mirror device 200, and the other of which is provided for another mirror device 200. In the first region R1, the meandering portion 250 of the one first hinge 205 at least partially protrudes toward the other first hinge 205 across the middle line L between the two first hinges 205, 205. In a second region R2 different from the first region R1, the meandering portion 250 of the other first hinge 205 at least partially protrudes toward the one first hinge 205 across the middle line L.

The second hinge 206 has the same configuration as the second hinge 106. However, one second hinge 206 is provided for one mirror device 200. The second hinge 206 is coupled to the middle portion of a second shorter side 131b of the mirror 131.

The first movable comb electrode 207A and the second movable comb electrode 207B are provided for a second shorter side 131b of the mirror 131 in a cantilever fashion through an first arm 279a and a second arm 279b. The first arm 279a extends in an X-axis direction. The second arm 279b branches from a midway of the first arm 279a toward a Y-axis direction.

The first movable comb electrode 207A has two first electrode fingers 271a, 271a. The first movable comb electrode 207A is disposed on the X-axis. The first movable comb electrode 207A is further from the mirror 131 than the second hinge 206 is. The two first electrode fingers 271*a*, 271*a* parallelly extend in the Y-axis direction.

The second movable comb electrode 207B has two second electrode fingers 271*b*, 271*b*. The second movable comb electrode 207B is not disposed on the X-axis but disposed on a position offset from the X-axis to the Y-axis direction. The second movable comb electrode 207B is disposed on an A-axis. The second electrode fingers 271*b*, 271*b* parallelly extend in the X-axis direction.

The first movable comb electrode 207A, the second movable comb electrode 207B, the first arm 279*a*, and the second arm 279*b* are comprised of a first silicon layer 191. Each of the number of the first electrode fingers 271*a* and the number of the second electrode fingers 271*b* is not limited to the two.

The base 202 is provided with a recess 202*a* in which the first movable comb electrode 207A is disposed. The recess 202*a* is provided with a first fixed comb electrode 208A. The first fixed comb electrode 208A has two first electrode fingers 281*a*, 281*a*. The two first electrode fingers 281*a*, 281*a* parallelly extend in the Y-axis direction. Each of the first electrode fingers 281*a* is disposed between adjacent two of the first electrode fingers 271*a* of the first movable comb electrode 207A. That is, the first electrode fingers 271*a* of the first movable comb electrode 207A face the first electrode fingers 281*a* of the first fixed comb electrode 208A.

The base 202 is also provided with the second fixed comb electrode 208B. The second fixed comb electrode 208B has two second electrode fingers 281*b*, 281*b*. The two second electrode fingers 281*b*, 281*b* parallelly extend in the X-axis direction. Each of the second electrode fingers 281*b* is disposed between the second electrode fingers 271*b* of the second movable comb electrode 207B. That is, the second electrode fingers 271*b* of the second movable comb electrode 207B face the second electrode fingers 281*b* of the second fixed comb electrode 208B.

The first fixed comb electrode 208A and the second fixed comb electrode 208B are comprised of the first silicon layer 191. The first fixed comb electrode 208A is electrically insulated from the first movable comb electrode 207A, and the second fixed comb electrode 208B is electrically insulated from the second movable comb electrode 207B. Each of the number of the first electrode fingers 281*a* and the number of the second electrode fingers 281*b* is not limited to the two.

The base 202 is provided with a first detection terminal 222, a second detection terminal 223, and a third detection terminal 224. Through the first detection terminal 222 and the second detection terminal 223A, a capacitance between the first movable comb electrode 207A and the first fixed comb electrode 208A can be detected. Through the first detection terminal 222 and the third detection terminal 224, a capacitance between the second movable comb electrode 207B and the second fixed comb electrode 208B can be detected.

The first detection terminal 222 is provided on the surface of a portion of the first silicon layer 191 of the base 202 electrically connected to the first movable comb electrode 207A and the second movable comb electrode 207B.

The second detection terminal 223 is provided on the surface of the first electrode portion 225. The first electrode portion 225 is comprised of the first silicon layer 191 of the base 202, and is independent from its vicinity on the oxide layer 192 of the base 202 to be electrically insulated. The first electrode portion 225 is coupled to the first fixed comb electrode 208A.

The third detection terminal 224 is provided on the surface of the second electrode portion 226. The second electrode portion 226 is comprised of the first silicon layer 191 of the base 202, and is independent from its vicinity on the oxide layer 192 of the base 202 to be electrically insulated. The second electrode portion 226 is coupled to the second fixed comb electrode 208B.

The mirror array 201 includes no reference electrode 194 provided for the mirror array 1. A reference electrode may be provided for the mirror array 201.

The mirror device 200 applies a drive voltage to the piezoelectric element 242 to make the actuator 204 curved upward. This allows for tilting the mirror 131. At that time, if the two actuators 204, 204 coupled to the one mirror 131 are curved in the same amount, the mirror 131 can be tilted about the A-axis. On the other hand, if one of the two actuators 204, 204 is curved in a different amount relative to the other one, the mirror 131 can be tilted about the X-axis.

When the mirror 131 is tilted, the first movable comb electrode 207A and the second movable comb electrode 207B are also tilted with the tilting of the mirror 131. Specifically, when the mirror 131 is tilted about the A-axis, the first movable comb electrode 207A is vertically displaced. This changes a capacitance between the first movable comb electrode 207A and the first fixed comb electrode 208A. The capacitance between the first movable comb electrode 207A and the first fixed comb electrode 208A can be detected through the first detection terminal 222 and the second detection terminal 223. Drive voltages of the piezoelectric elements 242, 242 are adjusted based on the change in the capacitance. This enables precise control of the degree of tilt of the mirror 131 about the A-axis. When the mirror 131 is tilted about the X-axis, the second movable comb electrode 207B is vertically displaced. This changes a capacitance between the second movable comb electrode 207B and the second fixed comb electrode 208B. The capacitance between the second movable comb electrode 207B and the second fixed comb electrode 208B can be detected through the first detection terminal 222 and the third detection terminal 224. Drive voltages of the piezoelectric elements 242, 242 are adjusted based on the change in the capacitance. This enables precise control of the degree of tilt of the mirror 131 about the X-axis.

When the mirror 131 is tilted about the A-axis, the second movable comb electrode 207B is also displaced with the tilting. However, the capacitance between the second movable comb electrode 207B and the second fixed comb electrode 208B is less changed since the second movable comb electrode 207B is disposed on the A-axis. That is, the capacitance between the second movable comb electrode 207B and the second fixed comb electrode 208B is changed mainly by the tilting of the mirror 131 about the X-axis, and is less affected by the tilting of the mirror 131 about the A-axis. When the mirror 131 is tilted about the X-axis, the first movable comb electrode 207A is displaced with the tilting. However, the capacitance between the first movable comb electrode 207A and the first fixed comb electrode 208A is less changed since the first movable comb electrode 207A is disposed on the X-axis. That is, the capacitance between the first movable comb electrode 207A and the first fixed comb electrode 208A is changed mainly by the tilting of the mirror 131 about the A-axis, and is less affected by the tilting of the mirror 131 about the X-axis.

The first movable comb electrode 207A is disposed so as to be closer to the second hinge 206 than to the first hinge 205. That is, the first movable comb electrode 207A is disposed adjacent to the A-axis. This reduces the amount of displacement of the first movable comb electrode 207A when the mirror 131 is tilted about the A-axis. As a result, this can extend the tilt range of the mirror 131 where the capacitance between the first movable comb electrode 207A and the first fixed comb electrode 208A can be detected. That is, this can extend the range where the degree of tilt of the mirror 131 about the A-axis can be precisely controlled. The second movable comb electrode 207B is disposed at a position near the X-axis. This reduces the amount of displacement of the second movable comb electrode 207B when the mirror 131 is tilted about the X-axis. As a result, this can extend the tilt range of the mirror 131 where the capacitance between the second movable comb electrode 207B and the second fixed comb electrode 208B can be detected. That is, this can extend the range where the degree of tilt of the mirror 131 about the X-axis can be precisely detected.

Second Embodiment

Figure 13:
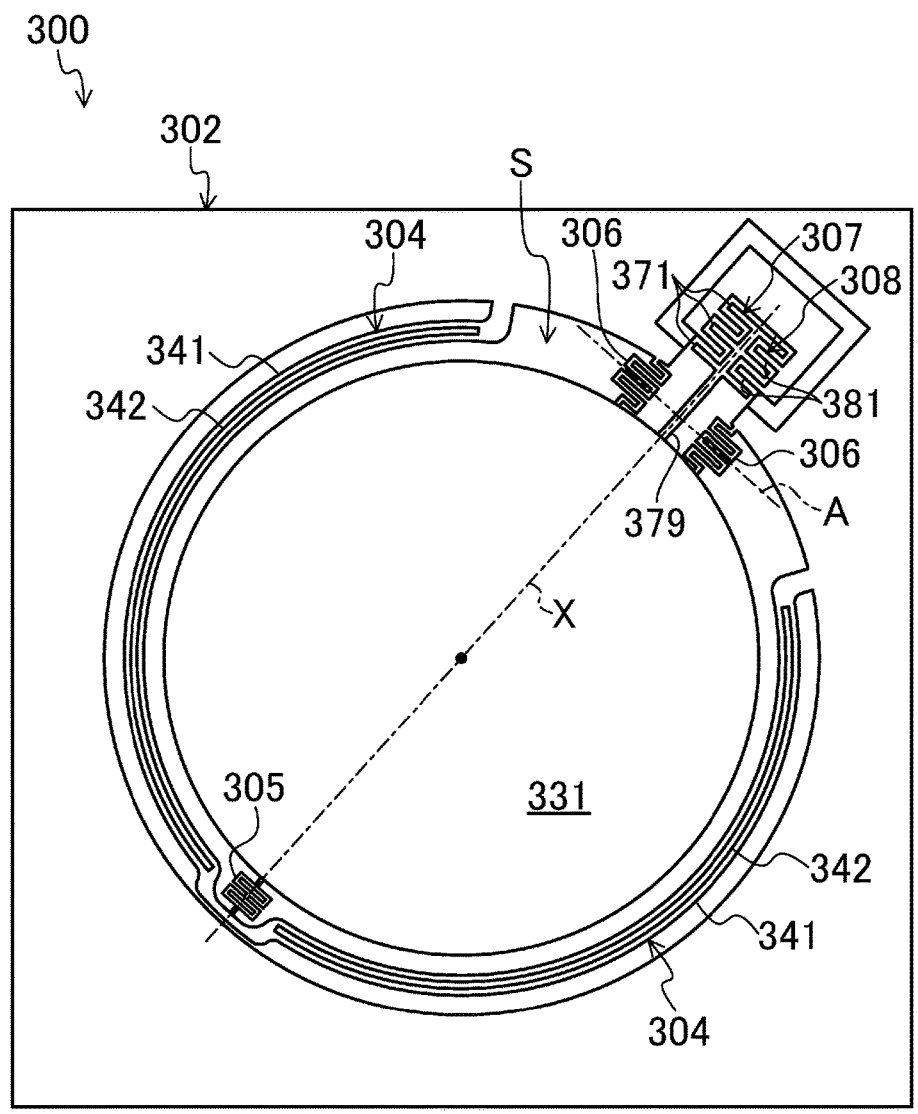
FIG. 13 is a plan view of a mirror device according to a second embodiment.

Next, a mirror device 300 according to a second embodiment will be described. FIG. 13 is a plan view of the mirror device 300. Here, parts of the configuration of the mirror device 300 different from the first embodiment will be mainly described. A part of the elements peculiar to the second embodiment may be described with reference characters in the 300 series. The elements having the same or similar configuration as or to those in the first embodiment are denoted by the same two- and one-digit numbers and the same symbol.

The mirror device 300 is used for a variable optical attenuator (VOA), for example. The mirror device 300 includes: a base 302; a mirror 331; actuators 304, 304 driving the mirror 331; a first hinge 305 coupling the mirror 331 to the actuators 304, 304; second hinges 306, 306 coupling the mirror 331 to the base 302; a movable comb electrode 307 provided for the mirror 331; a fixed comb electrode 308 provided for the base 302; and a controller (not shown in the figure).

The base 302 is frame-shaped with a circular opening.

The mirror 331 is circular plate-shaped when viewed from the top. The mirror 331 is disposed inside the circular opening of the base 302. An annular space S is formed between the base 302 and the mirror 331.

The mirror 331 is coupled to the base 302 through two second hinges 306, 306. The first hinge 305 is provided at a portion of the mirror 331 opposite the second hinges 306, 306. The first hinge 305 has a pair of two meandering portions. Each of the meandering portions has protrusions and recessed alternately disposed. The recesses of the two meandering portions are coupled together. The second hinge 306 is bent in a meandering manner as a whole.

The actuator 304 has an actuator body 341 and a piezoelectric element 342 stacked on the surface of the actuator body 341. The actuator body 341 extends substantially arcuately along the annular space S between the mirror 331 and the base 302. One actuator body 341 is provided between the first hinge 305 and one second hinge 306. The other actuator body 341 is provided between the first hinge 305 and the other second hinge 306. One end of the actuator body 341 is coupled to the base 302 at a position near the second hinges 306. The other end of the actuator body 341 is coupled to the first hinge 305. As well as the actuator body 341, the piezoelectric element 342 also extends substantially arcuately.

The actuators 304, 304 and the second hinges 306, 306 are symmetric about an X-axis passing through the center of the mirror 331 and the first hinge 305.

The movable comb electrode 307 is provided at the tip end of an arm 379 extending radially outward from the mirror 331. The arm 379 is provided between the two second hinges 306, 306. More specifically, the arm 379 is disposed on the X-axis. The movable comb electrode 307 has three electrode fingers 371, 371, . . . . Each of the electrode fingers 371 extends from the arm 379 toward either side so as to be orthogonal to the arm 379. The three electrode fingers 371, 371, . . . parallely extend in a direction orthogonal to the X-axis. The number of the electrode fingers 371 is not limited to the three.

The fixed comb electrode 308 is provided for the base 302. The fixed comb electrode 308 has four electrode fingers 381, 381, . . . . The four electrode fingers 381, 381, . . . parallel to one another extend in the direction orthogonal to the X-axis. Each of the electrode fingers 381 is disposed between the electrode fingers 371 of the movable comb electrode 307. That is, the electrode fingers 371 of the movable comb electrode 307 face the electrode fingers 381 of the fixed comb electrode 308. The fixed comb electrode 308 is electrically insulated from the movable comb electrode 307.

The movable comb electrode 307 and the fixed comb electrode 308 are disposed on the X-axis.

Although not shown, the base 302 is provided with a detection terminal used for detection of a capacitance between the movable comb electrode 307 and the fixed comb electrode 308.

As well as in the first embodiment, a reference electrode may be provided which has first electrode fingers corresponding to the electrode fingers 371 of the movable comb electrode 307 and second electrode fingers corresponding to the electrode fingers 381 of the fixed comb electrode 308.

Next, the operation of the mirror device 300 having such a configuration will be described. If the controller of the mirror device 300 applies a voltage to the piezoelectric elements 342, 342, the respective actuators 304 are curved such that the piezoelectric element 342 is positioned inside, and the end of the actuator 304 closer to the first hinge 305 is displaced upward. The same voltage is applied to the piezoelectric elements 342, 342 of the actuators 304, 304. As a result, the mirror 331 is tilted with the second hinges 306, 306 serving as the center. In other words, the mirror 331 is tilted about an A-axis orthogonal to the X-axis and substantially passing through the second hinges 306, 306.

When the mirror 331 is tilted, the movable comb electrode 307 is also displaced with the tilting. As a result, this changes the area where the electrode fingers 371 of the movable comb electrode 307 face the electrode fingers 381 of the fixed comb electrode 308, thereby changing the capacitance between the movable comb electrode 307 and the fixed comb electrode 308. The controller detects the capacitance between the movable comb electrode 307 and the fixed comb electrode 308 through the detection terminal, and adjusts the voltage applied to the piezoelectric elements 342, 342 based on the change in the capacitance. This allows for precisely controlling the degree of tilt of the mirror 331.

The movable comb electrode 307 is disposed so as to be closer to the second hinges 306 than to the first hinge 305. That is, the movable comb electrode 307 is disposed at a position near the A-axis serving as the center at the time of tilting of the mirror 331. This allows for reducing the amount of displacement of the movable comb electrode 307 when the mirror 331 is tilted about the A-axis. As a result, this can extend the tilt range of the mirror 331 where the capacitance between the movable comb electrode 307 and the fixed comb electrode 308 can be detected. That is, this can extend the range where the degree of tilt of the mirror 331 about the A-axis can be precisely controlled.

Since the actuator 304 is disposed using the annular space S, it is substantially arcuately formed. However, it is not limited to this configuration. The actuator 304 may be rectangular-shaped like the first embodiment. In this case, as well as in the first embodiment, the actuator 304, the first hinge 305, and the mirror 331 may be sequentially aligned on the substantially straight line.

Modification of Mirror Device

Figure 14:
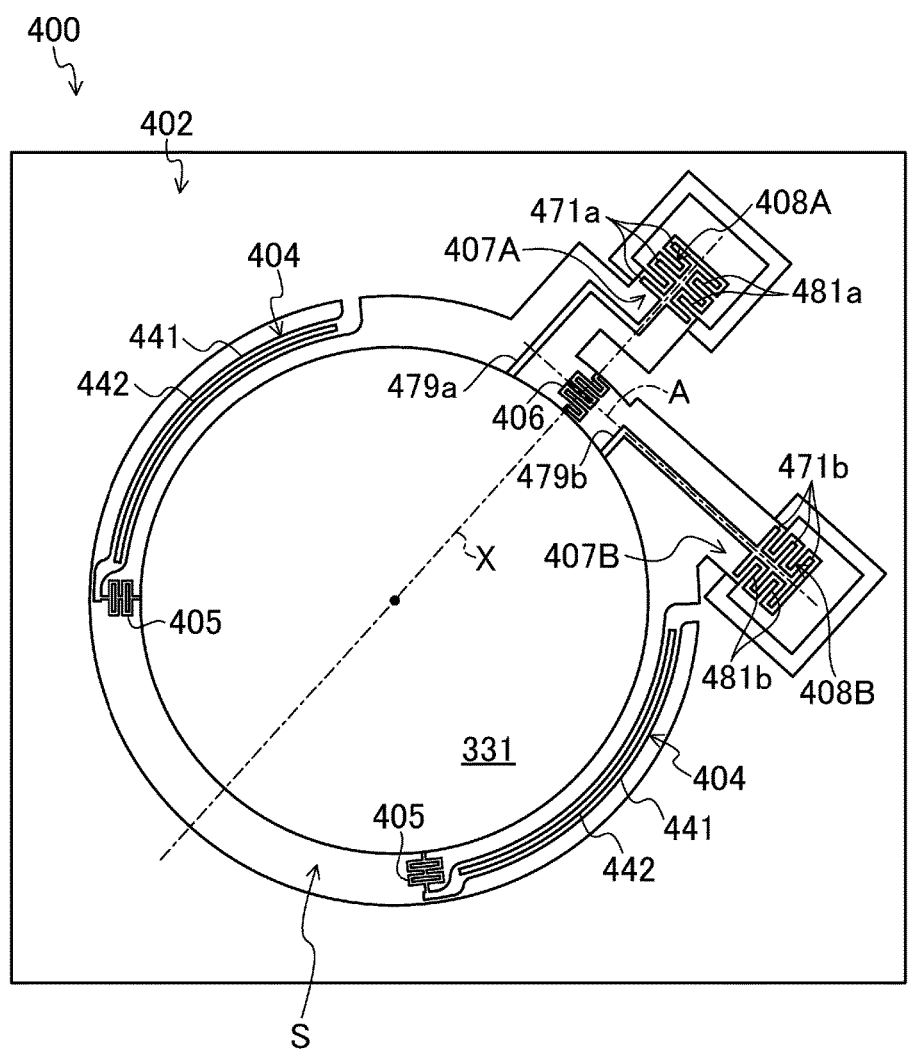
FIG. 14 is a plan view of a modification of the mirror array.

Next, a mirror device 400 according to a modification will be described. FIG. 14 is a plan view of the mirror device 400 according to the modification. Here, parts of the configuration of the mirror device 400 different from the mirror device 300 will be mainly described. A part of the elements peculiar to the modification may be described with reference characters in the 400 series. The elements having the same or similar configuration as or to those in the mirror device 300 are denoted by the same two- and one-digit numbers and the same symbol.

The mirror device 400 includes: a base 402; a mirror 331; actuators 404, 404 for driving the mirror 331; first hinges 405, 405 coupling the mirror 331 to the actuators 404, 404; a second hinge 406 coupling the mirror 331 to the base 402; a first movable comb electrode 407A and a second movable comb electrode 407B provided for the mirror 331; a first fixed comb electrode 408A and a second fixed comb electrode 408B provided for the base 402; and a controller (not shown in the figure).

The base 402 is frame-shaped with a circular opening.

The mirror 331 has the same configuration as the mirror 331 of the mirror device 300. The mirror 331 is coupled to the base 402 through one second hinge 406. The second hinge 406 is bent in a meandering manner as a whole.

The actuator 404 has an actuator body 441 and a piezoelectric element 442 stacked on the surface of the actuator body 441. There is an annular space S between the mirror 331 and the base 402. If the space S is divided into two spaces by an X-axis passing through the center of the mirror 331 and the second hinge 406, one actuator 404 is disposed in one of the two spaces and the other actuator 404 is disposed in the other space. The actuator body 441 extends substantially arcuately along the space. One end of each actuator body 441 is coupled to the base 402 at a position near the second hinge 406. The other end of each actuator body 441 is coupled to the mirror 331 through the first hinge 405. As well as the actuator body 441, the piezoelectric element 442 also extends substantially arcuately.

Each of the first hinges 405 has a pair of two meandering portion. Each of the meandering portions has protrusions and a recess alternately disposed. The recesses of the two meandering portions are coupled together.

The actuators 404, 404 and the first hinges 405, 405 are symmetric about an X-axis.

The first movable comb electrode 407A is provided at the tip end of a first arm 479a extending from the mirror 331 in the vicinity of the second hinges 406. The first arm 479a is disposed at a position which is near the second hinge 406 in the outer periphery of the mirror 331, and which is offset from the X-axis. The first arm 479a extends parallel to the X-axis from the mirror 331, and is orthogonally bent toward the X-axis. Once it reaches the X-axis, it is orthogonally bent in the X-axis direction. That is, the tip end of the first arm 479a extends on the X-axis. The first movable comb electrode 407A has three first electrode fingers 471a, 471a, . . . . Each of the first electrode fingers 471a extends from the tip end of the first arm 479a toward either side so as to be orthogonal to the tip end of the first arm 479a. The three first electrode fingers 471a, 471a, . . . parallely extend in a direction orthogonal to the X-axis.

The second movable comb electrode 407B is provided at the tip end of a second arm 479b extending from the mirror 331 in the vicinity of the second hinge 406. The second arm 479b extends parallel to the X-axis from the mirror 331 in the vicinity of the second hinge 406, and is orthogonally bent to extend in the direction orthogonal to the X-axis. The second movable comb electrode 407B has three second electrode fingers 471b, 471b, . . . . Each of the second electrode fingers 471b extends from the tip end of the second arm 479b toward either side so as to be orthogonal to the tip end of the second arm 479b. The three second electrode fingers 471b, 471b, . . . parallely extend in the X-axis direction.

Each of the number of the first electrode fingers 471a and the number of the second electrode fingers 471b is not limited to the three.

The first fixed comb electrode 408A is provided for the base 402. The first fixed comb electrode 408A has four first electrode fingers 481a, 481a, . . . . The first electrode fingers 481a, 481a, . . . parallely extend in the direction orthogonal to the X-axis. Each of the first electrode fingers 481a is disposed between adjacent two of the first electrode fingers 471a of the first movable comb electrode 407A. That is, the first electrode fingers 471a of the first movable comb electrode 407A face the first electrode fingers 481a of the first fixed comb electrode 408A. The first fixed comb electrode 408A is electrically insulated from the first movable comb electrode 407A.

The second fixed comb electrode 408B is provided for the base 402. The second fixed comb electrode 408B has four second electrode fingers 481b, 481b, . . . . The four second electrode fingers 481b, 481b, . . . parallely extend in the X-axis direction. Each of the second electrode fingers 481b is disposed between adjacent two of the second electrode fingers 471b of the second movable comb electrode 407B. That is, the second electrode fingers 471b of the second movable comb electrode 407B face the second electrode fingers 481b of the second fixed comb electrode 408B. The second fixed comb electrode 408B is electrically insulated from the second movable comb electrode 407B.

The first movable comb electrode 407A and the first fixed comb electrode 408A are disposed on the X-axis. The second movable comb electrode 407B and the second fixed comb electrode 408B are orthogonal to the X-axis, and are disposed on an A-axis passing through the second hinge 406.

Although not shown, the base 402 is provided with a detection terminal which is used for detection of a capacitance between the first movable comb electrode 407A and the first fixed comb electrode 408A, and a capacitance between the second movable comb electrode 407B and the second fixed comb electrode 408B.

Next, the operation of the mirror device 400 having such a configuration will be described. If the controller of the mirror device 400 applies a voltage to the piezoelectric elements 442, 442, the respective actuators 404 are curved such that the piezoelectric element 442 is positioned inside, and the end of the actuator 404 closer to the first hinge 405 is displaced upward. If the same voltage is applied to the piezoelectric elements 442, 442 of the two actuators 404, 404, the mirror 331 is tilted with the second hinge 406 serving as the center. In other words, the mirror 331 is tilted about the A-axis. On the other hand, if a voltage is applied to the piezoelectric element 442 of one of the two actuators 404, 404 and another voltage different from the voltage is applied to the piezoelectric element 442 of the other actuator 404, the mirror 331 is tilted about the X-axis.

When the mirror 331 is tilted, the first movable comb electrode 407A and the second movable comb electrode 407B are also displaced with the tilting. As a result, this changes the area where the first electrode fingers 471a of the first movable comb electrode 407A face the first electrode fingers 481a of the first fixed comb electrode 408A, thereby changing the capacitance between the first movable comb electrode 407A and the first fixed comb electrode 408A. This displacement also changes the area where the second electrode fingers 471b of the second movable comb electrode 407B face the second electrode fingers 481b of the second fixed comb electrode 408B, thereby changing the capacitance between the second movable comb electrode 407B and the second fixed comb electrode 408B. The controller detects the capacitance between the first movable comb electrode 407A and the first fixed comb electrode 408A, and the capacitance between the second movable comb electrode 407B and the second fixed comb electrode 408B through the detection terminal. The controller adjusts the voltage applied to the piezoelectric elements 442, 442 based on the change in the capacitance. This allows for precisely controlling the degree of tilt of the mirror 331.

The first movable comb electrode 407A is disposed so as to be closer to the second hinges 406 than to the first hinge 405. That is, the first movable comb electrode 407A is disposed at a position near the A-axis. This allows for reducing the amount of displacement of the first movable comb electrode 407A when the mirror 331 is tilted about the A-axis. As a result, this can extend the tilt range of the mirror 331 where the capacitance between the first movable comb electrode 407A and the first fixed comb electrode 408A can be detected. That is, this can extend the range where the degree of tilt of the mirror 331 about the A-axis can be precisely controlled. The second movable comb electrode 407B is disposed at a position near the X-axis. This allows for reducing the amount of displacement of the second movable comb electrode 407B when the mirror 331 is tilted about the X-axis. As a result, this can extend the tilt range of the mirror 331 where the capacitance between the second movable comb electrode 407B and the second fixed comb electrode 408B can be detected. That is, this can extend the range where the degree of tilt of the mirror 331 about the X-axis can be precisely controlled.

Other Embodiments

As can be seen from the foregoing description, the embodiments are described as examples of the technique of disclosed in the present application. However, the technique in the present disclosure is not limited to these, and various modifications, replacements, additions, omissions, etc., may be made as appropriate without departing from the scope of the disclosure. Other embodiments may be implemented by combining the elements described above. Not only the elements that are essential for solving the problem but also the elements that are not essential for solving the problem may be included in the elements shown in the attached drawings and the detailed description in order to exemplify the technique. Even if those non-essential elements are shown in the drawings or the detailed description, these elements should not be quickly construed as essential elements.

The above embodiments may have the following configurations.

In the first embodiment, the mirror array including a plurality of mirror devices is described. However, the technique is not limited to this configuration. One mirror device may be provided instead of the mirror array, like a galvano mirror. For example, a VOA may be formed by use of the mirror device of the first embodiment. The mirror array can be applied not only to the wavelength selection switch but also to various applications.

In the second embodiment, one mirror device is described. However, a plurality of mirror devices may constitute the mirror array.

The shape, size, and materials described in these embodiments are mere examples, and the technique is not limited to these. For example, the mirror 131 does not have to be rectangular-shaped when viewed from the top. The mirror 131 may be circular-shaped or oval-shaped. The mirror 331 does not have to be circular-shaped when viewed from the top. The mirror 331 may be ellipse-shaped or square-shaped. The shapes and numbers of the first hinges 105, 205, 305, 405 are not limited to the above embodiments. The shapes and numbers of the second hinges 106, 206, 306, 406 are not limited to the above embodiments.

As well as the first hinges 105, 205, 305, 405, each of the second hinges 106, 206, 306, 406 may have two meandering portions in which protrusions and recesses are alternately disposed, and the recesses in the two meandering portions are coupled together. Each of the first hinges 105, 205, 305, and 405 does not have to have the configuration where two meandering portions in which protrusions and recesses are alternately disposed, and the recesses in the two meandering portions are coupled together. The first hinges 105, 205, 305, and 405 may have another configuration.

The configurations of the movable comb electrodes 107, 207A, 207B, 307, and 407A, 407B and the configurations of the fixed comb electrodes 108, 208A, 208B, 308, 408A, and 408B are mere examples. These elements may have another configuration. For example, the movable comb electrodes 107, 207A, and 207B may be provided for an arm extending from a longer side of the mirror 131. The movable comb electrode 107 may be provided parallel to the second hinge 206 in the Y-axis direction, like the second movable comb electrode 207B. Furthermore, although the electrode fingers of the movable comb electrodes 107, 207B extend in the X-axis direction, they may extend in the Y-axis direction, for example. Similarly, although the electrode fingers of the movable comb electrode 207A extend in the Y-axis direction, they may extend in the X-axis direction, for example. The positions and the extending direction of the movable comb electrodes 307, 407A, and 407B and the fixed comb electrodes 308, 408A, and 408B may be set as appropriate.

Regarding the piezoelectric element, a non-lead piezoelectric material such as KNN ((K, Na) $NBO_3$) may be used as a piezoelectric element layer instead of PZT.

The shield walls 195, 196 are provided for the above embodiments. However, the technique is not limited to this configuration. The shield walls 195, 196 may be omitted.

The embodiments described above are merely illustrative in nature, and are not intended to limit the scope, applications, and use of the present disclosure.

INDUSTRIAL APPLICABILITY

As can be seen from the foregoing, the technique disclosed herein is useful for a mirror device.

DESCRIPTION OF REFERENCE CHARACTERS 100, 200, 300, 400 mirror device
131, 331 mirror
104, 204, 304, 404 actuator 141, 241, 341, 441 actuator body
142, 242, 342, 442 piezoelectric element
107, 307 movable comb electrode
207A, 407A first movable comb electrode
207B, 407B second movable comb electrode
108, 308 fixed comb electrode
208A, 408A first fixed comb electrode
208B, 408B second fixed comb electrode

The invention claimed is:

1. A mirror device comprising:
a mirror including a mirror body, and a mirror surface layer stacked on a surface of the mirror body;
an actuator having an actuator body and a piezoelectric element stacked on a surface of the actuator body, wherein the piezoelectric element is configured to actuate the actuator body from a first position to a second position, and tilting the mirror;
a first hinge coupling a first side surface of the mirror body to the actuator, and curved when the mirror is tilted;
a base;
a second hinge directly coupling a second side surface of the mirror body to the base, and curved when the mirror is tilted;
a movable comb electrode coupled to the mirror; and
a fixed comb electrode fixed to the base, and facing the movable comb electrode, wherein
the first and second hinges are spaced apart from each other,
the actuator is controlled based on a capacitance between the movable comb electrode and the fixed comb electrode,
the movable comb electrode is disposed on a portion of the mirror closer to the second hinge than to the first hinge when viewed in plan, and
the actuator extends from the base.

2. The mirror device of claim 1, wherein
the movable comb electrode is disposed on an opposite side of the mirror from the actuator.

3. The mirror device of claim 1, wherein
stiffness of the second hinge is higher than that of the first hinge.

4. The mirror device of claim 1, wherein
the mirror, the second hinge, and the movable comb electrode are arranged in sequence.

5. The mirror device of claim 1, wherein
the mirror includes a plurality of the mirrors,
the actuator includes a plurality of actuators,
the first hinge includes a plurality of first hinges,
the second hinge includes a plurality of second hinges,
the movable comb electrode includes a plurality of movable comb electrodes,
the mirrors are disposed in a predetermined direction parallel to an axis about which each of the mirrors is tilted,
each of the mirrors is provided with at least associated one of the actuators, at least associated one of the first hinges, at least associated one of the second hinges, and at least associated one of the movable comb electrodes, and
the at least associated one of the actuators, the at least associated one of the first hinges, the each of the mirrors, the at least associated one of the second hinges, and the at least associated one of the movable comb electrodes are disposed in sequence in a direction orthogonal to the predetermined direction.

6. The mirror device of claim 1, wherein
the mirror is tilted about an axis substantially passing through the second hinge, and
a portion of the mirror to which the first hinge is coupled is displaced in a direction intersecting with the surface of the mirror by operation of the actuator.

7. The mirror device of claim 1, wherein
the movable comb electrode having a plurality of electrode fingers is coupled to the mirror through an arm, and
the arm intersects with an axis about which the mirror is tilted.

8. The mirror device of claim 1, wherein
the mirror is tilted about an axis substantially passing through the second hinge,
a portion of the mirror to which the first hinge is coupled is displaced in a direction intersecting with the surface of the mirror by operation of the actuator,
the movable comb electrode having a plurality of electrode fingers is coupled to the mirror through an arm, and
the arm intersects with an axis about which the mirror is tilted.

9. A mirror device comprising:
a mirror including a mirror body, and a mirror surface layer stacked on a surface of the mirror body;
an actuator having an actuator body and a piezoelectric element stacked on a surface of the actuator body, wherein the piezoelectric element is configured to actuate the actuator body from a first position to a second position, and tilting the mirror;
a first hinge coupling a first side surface of the mirror body to the actuator, and curved when the mirror is tilted;
a base;
a second hinge directly coupling a second side surface of the mirror body to the base, and curved when the mirror is tilted;
a movable comb electrode coupled to the mirror;
a fixed comb electrode fixed to the base, and facing the movable comb electrode; and
a controller applying a voltage to the piezoelectric element based on a capacitance between the movable comb electrode and the fixed comb electrode to control the actuator, wherein
the actuator extends from the base,
the first and second hinges are spaced apart from each other,
the controller controls the actuator such that the mirror is tilted within a predetermined tilt range where the capacitance monotonically increases or decreases, and
an absolute value of a rate of a change in the capacitance relative to a tilt angle of the mirror is larger in a state where the mirror is tilted at a limiting angle closer to an initial state, where no voltage is applied to the mirror, within the tilt range than in the initial state.

10. The mirror device of claim 9, wherein
the mirror is tilted about an axis substantially passing through the second hinge, and
a portion of the mirror to which the first hinge is coupled is displaced in a direction intersecting with the surface of the mirror by operation of the actuator.

11. The mirror device of claim 9, wherein
the movable comb electrode having a plurality of electrode fingers is coupled to the mirror through an arm, and
the arm intersects with an axis about which the mirror is tilted.

12. The mirror device of claim 9, wherein
the mirror is tilted about an axis substantially passing through the second hinge,
a portion of the mirror to which the first hinge is coupled is displaced in a direction intersecting with the surface of the mirror by operation of the actuator,
the movable comb electrode having a plurality of electrode fingers is coupled to the mirror through an arm, and
the arm intersects with an axis about which the mirror is tilted.

13. A mirror device comprising:
a mirror including a mirror body, and a mirror surface layer stacked on a surface of the mirror body;
an actuator having an actuator body and a piezoelectric element stacked on a surface of the actuator body, wherein the piezoelectric element is configured to actuate the actuator body from a first position to a second position, and tilting the mirror;
a first hinge coupling a first side surface of the mirror body to the actuator, and curved when the mirror is tilted;
a base;
a second hinge directly coupling a second side surface of the mirror body to the base, and curved when the mirror is tilted;
a movable comb electrode coupled to the mirror;
a fixed comb electrode fixed to the base, and facing the movable comb electrode; and
a controller applying a voltage to the piezoelectric element based on a capacitance between the movable comb electrode and the fixed comb electrode to control the actuator, wherein
the actuator extends from the base,
the first and second hinges are spaced apart from each other,
the mirror is tilted in an initial position where no voltage is applied to the piezoelectric element compared with a reference position where the capacitance reaches the maximum value, and
the controller applies a voltage to the piezoelectric element to tilt the mirror toward the opposite side of the reference position from the initial position within a predetermined tilt range where the capacitance monotonically increases or decreases on the opposite side.

14. The mirror device of claim 13, wherein
the mirror is tilted about an axis substantially passing through the second hinge, and
a portion of the mirror to which the first hinge is coupled is displaced in a direction intersecting with the surface of the mirror by operation of the actuator.

15. The mirror device of claim 13, wherein
the movable comb electrode having a plurality of electrode fingers is coupled to the mirror through an arm, and
the arm intersects with an axis about which the mirror is tilted.

16. The mirror device of claim 13, wherein
the mirror is tilted about an axis substantially passing through the second hinge,
a portion of the mirror to which the first hinge is coupled is displaced in a direction intersecting with the surface of the mirror by operation of the actuator,
the movable comb electrode having a plurality of electrode fingers is coupled to the mirror through an arm, and
the arm intersects with an axis about which the mirror is tilted.

* * * * *